United States Patent
Lebon-Schneider et al.

(10) Patent No.: US 9,699,729 B2
(45) Date of Patent: Jul. 4, 2017

(54) METHODS AND SYSTEMS FOR REGULATING COMMUNICATIONS AT A MOBILE COMMUNICATIONS DEVICE

(71) Applicant: DISA TECHNOLOGIES, INC., Astoria, NY (US)

(72) Inventors: Francois Lebon-Schneider, Astoria, NY (US); Jacobus Adriaan Louw, Surrey (CA)

(73) Assignee: DISA TECHNOLOGIES, INC., Astoria, NY (US)

(*) Notice: Subject to any disclaimer, the term of this patent is extended or adjusted under 35 U.S.C. 154(b) by 0 days.

(21) Appl. No.: 14/869,824

(22) Filed: Sep. 29, 2015

(65) Prior Publication Data

US 2016/0095056 A1 Mar. 31, 2016

Related U.S. Application Data

(60) Provisional application No. 62/057,018, filed on Sep. 29, 2014.

(51) Int. Cl.
| | | |
|---|---|---|
| *H04B 1/38* | (2015.01) | |
| *H04W 52/02* | (2009.01) | |
| *H04W 4/14* | (2009.01) | |
| *H04L 12/58* | (2006.01) | |
| *G06T 11/60* | (2006.01) | |

(52) U.S. Cl.
CPC ......... *H04W 52/0216* (2013.01); *G06T 11/60* (2013.01); *H04L 51/04* (2013.01); *H04L 51/16* (2013.01); *H04L 51/34* (2013.01); *H04W 4/14* (2013.01); *H04W 52/028* (2013.01); *H04W 52/0235* (2013.01); *G06T 2200/24* (2013.01); *Y02B 60/50* (2013.01)

(58) Field of Classification Search
CPC ........ G06F 9/4843; G06F 9/4893; G06F 9/54; H04W 4/02
USPC .......................................................... 455/574
See application file for complete search history.

(56) References Cited

U.S. PATENT DOCUMENTS

| | | |
|---|---|---|
| 7,212,808 B2 | 5/2007 | Engstrom et al. |
| 7,702,315 B2 | 4/2010 | Engstrom et al. |
| 8,140,632 B1 | 3/2012 | Jablokov et al. |
| 8,495,147 B1 | 7/2013 | Lang et al. |

(Continued)

FOREIGN PATENT DOCUMENTS

CN 102946497 A 2/2013

OTHER PUBLICATIONS

International search report and written opinion dated Dec. 28, 2015 for PCT Application No. PCT/US15/52853.

*Primary Examiner* — Ajibola Akinyemi
(74) *Attorney, Agent, or Firm* — Wilson Sonsini Goodrich & Rosati

(57) ABSTRACT

The present disclosure provides methods and systems for regulating communications between a mobile communications device and a plurality of communication servers with improved power consumption at the mobile communications device. Such methods and systems may use a schedule that synchronizes transmission of the communications from the mobile communications device to at least a subset of the plurality of communications servers or (ii) retrieval of the communications from at least the subset of the plurality of communications servers to the mobile communications device over a period of time.

22 Claims, 18 Drawing Sheets

(56) References Cited

U.S. PATENT DOCUMENTS

| | | |
|---|---|---|
| 2003/0221020 A1 | 11/2003 | Hejl |
| 2004/0123299 A1 | 6/2004 | O'Neill |
| 2004/0137884 A1 | 7/2004 | Engstrom et al. |
| 2004/0137955 A1 | 7/2004 | Engstrom et al. |
| 2007/0277110 A1 | 11/2007 | Rogers et al. |
| 2009/0327390 A1* | 12/2009 | Tran .................... G06F 9/4843 709/201 |
| 2011/0040990 A1 | 2/2011 | Chan et al. |
| 2011/0251992 A1 | 10/2011 | Bethlehem et al. |
| 2012/0003988 A1* | 1/2012 | Leica .................... H04W 4/02 455/456.1 |
| 2014/0052864 A1 | 2/2014 | Van Der Linden et al. |
| 2014/0085136 A1 | 3/2014 | Alpert et al. |
| 2014/0181560 A1 | 6/2014 | Muralidhar et al. |
| 2015/0208352 A1* | 7/2015 | Backholm ......... H04W 52/0251 455/574 |

\* cited by examiner

METHODS AND SYSTEMS FOR REGULATING COMMUNICATIONS AT A MOBILE COMMUNICATIONS DEVICE

CROSS-REFERENCE

This application claims priority to U.S. Provisional Application No. 62/057,018, filed Sep. 29, 2014, which is entirely incorporated herein by reference.

BACKGROUND

Instant messaging systems have become a method of communication for people using computers and/or mobile devices, such as tablet computers or smartphones. Many different instant messaging protocols have been developed by many different vendors of such services. Some protocols facilitate communications using the transfer of character-based text messages. Various protocols permit the transfer of images. Some protocols permit the transfer of video data. Each of the protocols facilitates communications between users using the messaging service corresponding to the protocol. Some messaging services are not configured to facilitate communication to and from user's using a different messaging service and/or a different protocol than that supported by the messaging service. Because so many different messaging services and/or protocols are now in existence, some users use multiple messaging services so as to communicate to users of these various services.

SUMMARY

The present disclosure provides messaging systems and methods, including systems and methods that employ scheduled heart-beats for use with instant-messaging servers.

Apparatus and associated methods relate to a method of scheduling a plurality of non-coincident wakelock requests to obtain a minimum set of shared wakelock requests. In an illustrative embodiment, each wakelock request may correspond to a messaging service's heartbeat requirement. A messenger service, for example, may require a remote user to ping a server at predetermined intervals to maintain connection with a messaging server. In some embodiments, when a user begins using a new messaging service, a messaging coordinator may add a wakelock request corresponding to the new messaging service to an existing wakelock request schedule. In an exemplary embodiment, when a user begins using a new messaging service, a messaging coordinator may modify an existing wakelock request schedule to accommodate a wakelock request corresponding to the new messaging service. A wakelock request coordinator may advantageously minimize power consumption by sharing wakelock requests between two or more messaging applications.

Various embodiments may achieve one or more advantages. For example, some embodiments may merge communications of a single contact using multiple communications channels into a single thread. Contact lists may be simplified when multiple channels are merged. Broadcasting communications to multiple destinations may be simplified. Battery life of mobile devices may be improved. Mobile devices may operate more efficiently when exemplary messaging managers coordinate activities of multiple communications channels. In some embodiments, communications applications may execute faster and/or more efficiently.

An aspect of the present disclosure provides methods for regulating communications between a communications device (e.g., mobile communications device) and a plurality of communication servers with improved power consumption at the communications device. In some embodiments, a method for regulating communications between a mobile communications device and a plurality of communication servers with improved power consumption at the mobile communications device comprises (a) bringing a mobile communications device in network communication with the plurality of communications servers per a schedule that synchronizes (i) transmission of the communications from the mobile communications device to at least a subset of the plurality of communications servers or (ii) retrieval of the communications from at least the subset of the plurality of communications servers to the mobile communications device over a period of time, wherein the mobile communications device includes an electronic display with a user interface for displaying the communications in a unified thread; (b) using the schedule to (i) retrieve the communications at the mobile communications device from at least the subset of the plurality of communications servers, or (ii) transmit the communications from the mobile communications device to at least the subset of the plurality of communications servers, wherein the communications are retrieved or transmitted over the period of time; and (c) displaying the communications in the unified thread of the user interface, thereby regulating the communications between the mobile communications device and the plurality of communication servers with improved power consumption at the mobile communications device.

In some embodiments, the schedule synchronizes communications to or from a first subset of communications servers of the plurality of communications servers, and communications to or from a second subset of communications servers of the plurality of communications servers, wherein the first subset is different than the second subset. In some embodiments, at least some of the plurality of communications servers transmit and receive communications of different types. In some embodiments, at least one of the plurality of communications servers transmits and receives instant messaging communications, and at least one of the plurality of communications servers transmits and receives text message communications. In some embodiments, the mobile communications device is in intermittent communication with the plurality of communications servers. In some embodiments, the method further comprises using a computer processor to generate the schedule to retrieve communications from or transmit communications to the plurality of communications servers. In some embodiments, the schedule coordinates wakelock requests to the plurality of communications servers. In some embodiments, (b) comprises pinging the communications servers per the schedule. In some embodiments, a given communication is displayed in the unified thread with a graphical element that is indicative of which of the plurality of communications servers the given communication was retrieved from or transmitted to.

In some embodiments, the schedule includes a composite wakelock request schedule. In some embodiments, the method further comprises, prior to (b), adding a new wakelock request schedule to the composite wakelock request schedule. In some embodiments, adding comprises (i) rearranging the composite wakelock request schedule to include the new wakelock request schedule, (ii) adding the new wakelock to an open position, or (iii) restarting a wakelock scheduler that implements the composite wakelock request schedule. In some embodiments, the wakelock request schedule includes wake-up intervals with coordinated wakelock requests.

Another aspect of the present disclosure provides systems for regulating communications between a communications device (e.g., mobile communications device) and a plurality of communication servers with improved power consumption at the communications device. In some embodiments, a system for regulating communications between a mobile communications device and a plurality of communication servers with improved power consumption at the mobile communications device comprises a communications interface that brings the mobile communications device in network communication with the plurality of communications servers per a schedule that synchronizes (i) transmission of the communications to at least a subset of the plurality of communications servers or (ii) retrieval of the communications from at least the subset of the plurality of communications servers over a period of time, wherein the mobile communications device includes an electronic display with a user interface for displaying the communications to or from the plurality of communications servers in a unified thread; and a computer processor that is programmed to use the schedule to (i) retrieve the communications from at least the subset of the plurality of communications servers or transmit the communications to at least the subset of the plurality of communications servers, wherein the communications are retrieved or transmitted over the period of time, and (ii) display the communications in the unified thread of the user interface, thereby regulating communications between the mobile communications device and the plurality of communication servers with improved power consumption at the mobile communications device.

In some embodiments, the computer processor is included in the mobile communications device. In some embodiments, the schedule synchronizes communications to or from a first subset of communications servers of the plurality of communications servers, and communications to or from a second subset of communications servers of the plurality of communications servers, wherein the first subset is different than the second subset. In some embodiments, the computer processor is programmed to generate the schedule to retrieve communications from or transmit communications to the plurality of communications servers. In some embodiments, the schedule coordinates wakelock requests to the plurality of communications servers. In some embodiments, the computer processor is programmed to ping the communications servers per the schedule.

In some embodiments, the schedule includes a composite wakelock request schedule. In some embodiments, the computer processor is programmed to add a new wakelock request schedule to the composite wakelock request schedule by (1) rearrange the composite wakelock request schedule to include the new wakelock request schedule, (2) add the new wakelock to an open position, or (3) restart a wakelock scheduler that implements the composite wakelock request schedule. In some embodiments, the wakelock request schedule includes wake-up intervals with coordinated wakelock requests.

Another aspect of the present disclosure provides a computer-readable medium comprising machine executable code that, upon execution by one or more computer processors, implements any of the methods above or elsewhere herein.

Another aspect of the present disclosure provides a computer system comprising one or more computer processors and a computer-readable medium coupled thereto. The computer-readable medium comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "wakelock," as used herein, generally refers to a power management routine that controls the power state of a mobile communications device (or mobile device) or computer program on the mobile communications device. In some examples, a wakelock keeps the mobile communications device from going to sleep. A wakelock may wake up a device or computer program that is in a rest, inactive, or sleeping state.

In an example, a wakelock is set to wake up a computer program, an electronic device, or any sort of software from sleep, rest, or inactivity to perform a task. In another example, a wakelock keeps the electronic device from going to sleep, rest, or an inactive state.

Reference will now be made to the figures, wherein like numerals refer to like parts throughout. It will be appreciated that the figures are not necessarily drawn to scale.

To aid understanding, this document is organized as follows. First, an exemplary use scenario of a message coordinating system is briefly introduced with reference to FIGS. 1A-1B. Second, with reference to FIG. 1C an exemplary message managing system is introduced. Then, with reference to FIGS. 2-6 merging operations of multiple communications threads into a single collated thread will be described. Pinging consolidation will then be introduced with reference to FIGS. 7-8. Finally, exemplary methods used for merging pinging schedules of multiple communications services will be described with reference to FIGS. 9-13. Each of the communications services may have one or more communications servers.

Figure 1A:
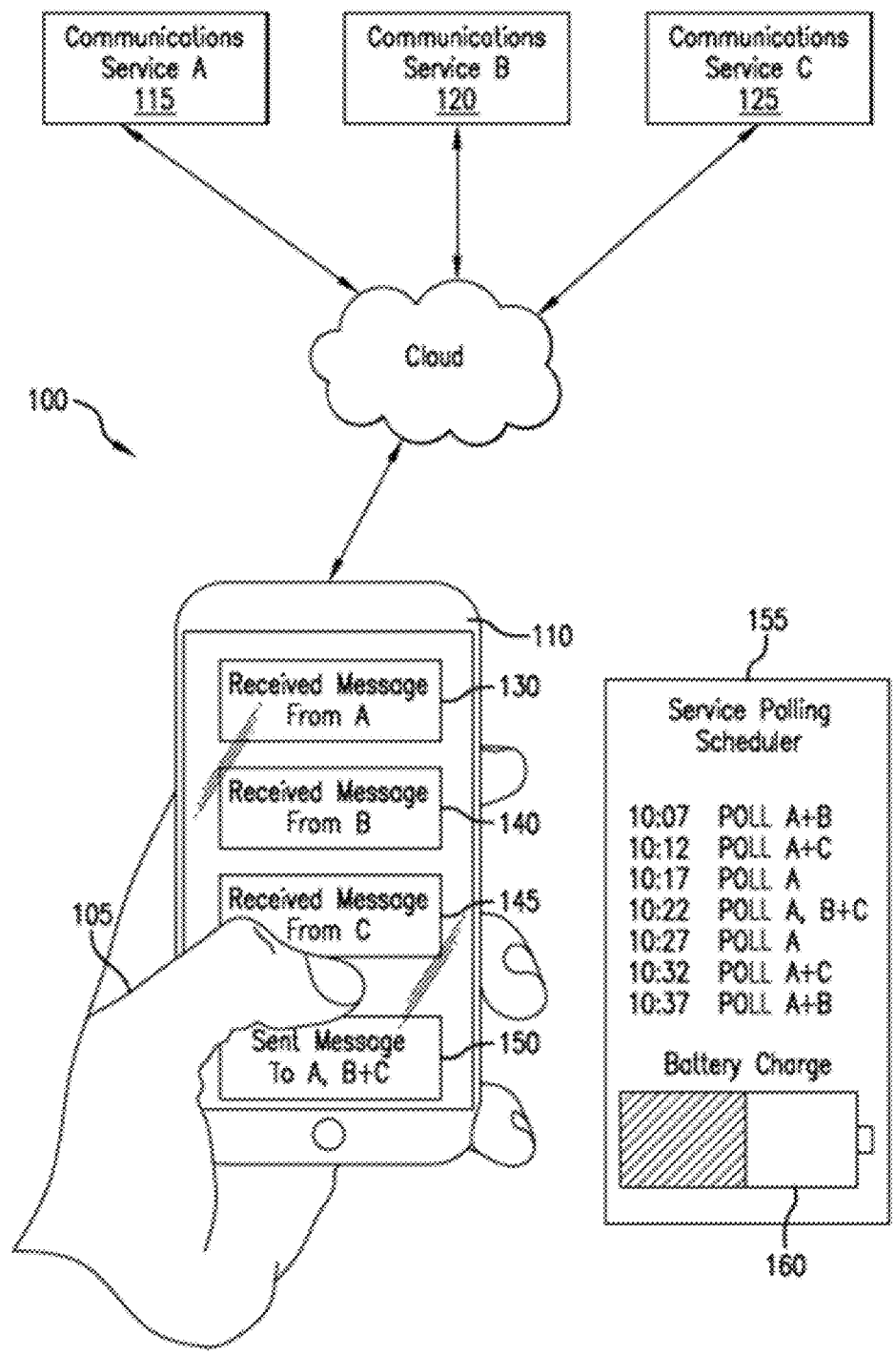
FIG. 1A-1B depict exemplary scenarios in which a unified message coordinating system is used.

FIG. 1A depicts an exemplary scenario in which a unified message coordinating system is used. In FIG. 1A, a three-way instant messaging communication 100 is being conducted. A user 105 of a mobile communications device 110 (or mobile electronic device) is communicating with three or more other remote users (not depicted). The remote users are communicating using three different communications services 115, 120, 125. Each of the communications services may have one or more communications servers. The user's mobile communications device 110 is running software that coordinates communications to and from a plurality of different communications services 115, 120, 125. The user has received a message A 130, which is displayed on a display screen 135 of the mobile communications device 110. The message A was sent from a remote user via communications service A 115. After message A was sent, a remote user sent message B 140 via communications service B 120. The communications coordinating software displays message B 140 on the display screen 135. After message B 140 was sent, a remote user sent message C 145 via communications service C 125. The communications coordinating software displays message C 145 on the display screen 125. Messages A 130, B 140 and C 145 are sorted according to the time each message was sent and then displayed in the sorted order. The user 105 then composes and sends a response 150 that is transmitted to all three remote users via the communications service 115, 120, 125 of each user. The communications coordinating software may send the message three times, each time using a communications protocol corresponding to a different one of the three communications services 115, 120, 125. The communications coordinating software may advantageously facilitate communications to and/or from multiple communications services.

The communications coordinating software may include a service coordinating scheduling engine. Some communications services require pinging at certain intervals to maintain an active communications link, for example. Thus, when a mobile communications device 110 is in a sleep mode (e.g. to minimize battery drain), the communications coordination software coordinates wakelock requests of multiple different communications requirements. If such wakelock requests are not coordinated, the mobile device 110 may be awoken with greater frequency than if wakelock requests are coordinated. The service coordinating scheduling engine may create a wakelock request schedule 155 for that minimizes the number of waking events. The depicted wakelock request schedule 155 has scheduled communications services A 115 and B 120 to be pinged at 10:07. Then at 10:12, communications services A 115 and C 125 are scheduled to be pinged. In the depicted example, pinging of communications service A 115 is scheduled every five minutes, pinging of communications service B 120 is scheduled every ten minutes, and pinging of communications services C 125 is scheduled every fifteen minutes. By coordinating wakelock request schedules of the various communications services the battery charge as indicated in a battery charge indicator 160 may advantageously be conserved.

Figure 1B:
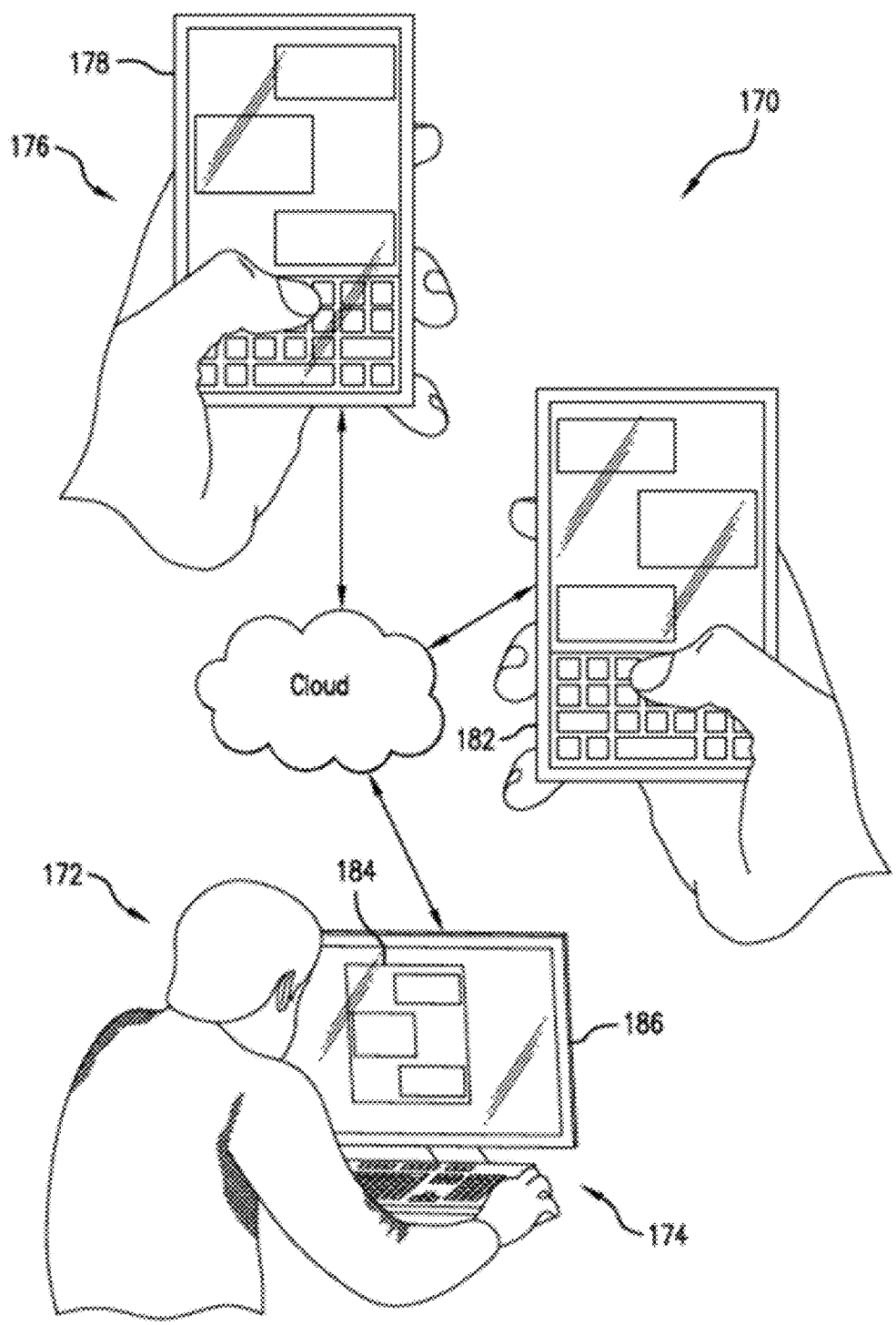

FIG. 1B depicts an exemplary scenario in which a unified message coordinating system is used. In FIG. 1B, a three-way instant messaging communication 170 is being conducted. The communication involves three distinct entities: a user 172 seated at a desktop computer 174, a user 176 operating a mobile device 178, and a user 180 operating a mobile device 182. The three-way communication 170 may involve a common activity that the three parties 172, 176, 180 are planning, for example. Each of the two parties 176, 180 using mobile devices 178, 182 may be communicating using different communications protocols from each other. For example, one party 176 may be communicating using a text messaging protocol (e.g. SMS) or electronic mail (email) over a mobile phone network. The other party 180 may be communicating using an instant messaging services proprietary communications protocol over a wireless internet network (e.g. Wi-Fi). The desktop computer 174 may be running message coordination software. The message coordination software, may, for example, collate the messages sent using different communications protocols into a single communication's thread 184 displayed on a display monitor 186. The collated contributions may be ordered chronologically, for example. The party 172 may compose a message for transmission to the parties 176, 180. The message coordination software may send the composed message to each of the two mobile devices 178, 182 associated with the two parties 176, 180 using the specific communications protocols used by each of the parties 176, 180. The message coordination software may advantageously organize display and facilitate transmission of multi-protocol communications.

When communicating using one of many instant messaging protocols or one of the text messaging protocols, packets of information are sent at discrete times. For example, a user my type a text message into a mobile device. Then, when satisfied with the composition, the user may touch a "send button" to commence transmission. The entire composition may then be sent in the form of an electromagnetic signal to a receiver. The user may then compose another communication or may await a response from an intended receiving person of the original transmission. Each such transmission can be thought of as a transmission packet. These packets can then be displayed in such a fashion as to visually indicate that the composition is all part of a single packet. The composition may be circumscribed, for example by an outline or bubble when displayed on a display device. The packet may be called a "bubble" due to the way it can be visually represented.

During the course of a conversation using a messaging protocol, a series of communication packets may be transmitted. Some of the series of communications packets may be transmitted by a first party to a second party. Some of the series of communications packets may be transmitted by the second party to the first party, for example. The series of communications packets may be in the form of a conversation with one party sending a transmission followed by that party receiving a response. The series of communications packets associated with the two parties may be called a thread, for example. Each thread can be displayed in such a fashion as to visually indicate that the series of transmissions is associated with a distinct set of users. For example, the thread may be annotated by the names of the communicating participants. The thread may be called a bubble group in honor due to the way it can visually appear when displayed when packets are circumscribe in a bubble.

In the message coordination software used by the party 172 for the communication 170, two distinct threads were being conducted, one between party 172 and party 176, and one between party 172 and 180. Party 176 and party 180 may have been unable to see the contributions of the other of the two parties 176, 180. For example, if the communications protocols used by the parties 176, 180 were incompatible with each other, each of the parties 176, 180 may have been privy only to packets sent by party 172. In some embodiments, however, the message coordination software may receive packets from the parties 176, 180 and resend them to the other party 180, 176 respectively, so that the entirety of both threads are communicated to all three parties 172, 176, 180.

Figure 1C:
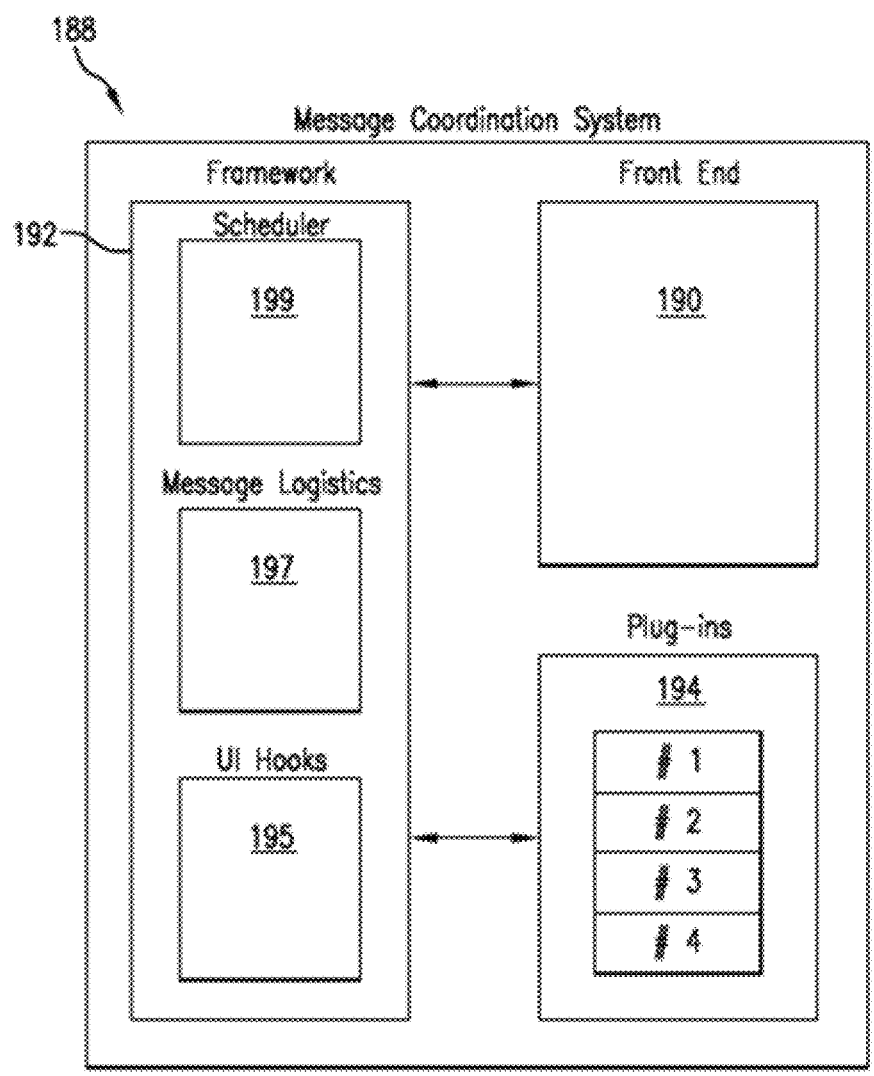
FIG. 1C depicts a block diagram of an exemplary message coordinating system.

FIG. 1C depicts a block diagram of an exemplary message coordination system. In FIG. 1C, an exemplary message coordinating system 188 includes a front-end 190 a framework 192 and plug-ins 194. The front-end 190 is the module that interfaces between the framework 192 and the user input/output of a communications device. The front-end 190 then is a translator of sorts. The front-end 190 translates the display information provided by the framework 192 to a signal format usable by a display device of the communications device. Similarly, the front-end 190 translates the signals responsive to inputs provided by the user of the communications device to the framework for further processing. Audible signals may too be transmitted between the front-end 190 and the framework 192.

The plug-ins 194 are code modules specific to particular communications protocols. A specific messaging service may write a plug-in 194 for a specific communications protocol associated with the specific messaging service. The plug-in 194 may translate signals of the specific communications protocol to those required by the framework 192. The framework 192 may make the required signals known so that various messaging services may write plug-ins 194 to interface with the message coordination system 188. The message coordination system 188 may be extendable as new messaging services create plug-ins 194 for the message coordination system 188. Such plug-ins 194 may be distributed via the messaging service's website, or via third party distribution networks such as iTunes, Androidcenter or Googleplay, for examples.

The framework 192 may have user interface (UI) hooks 195, message logistics module 197, and a wakelock scheduler 199. The message logistics module 197 may perform all operations that are common among message communications systems. For example, the message logistics module 197 may receive a text message communication from the plug-in and present it to the framework. The message logistics module 197 may similarly receive an outgoing message from the framework and present it to the plug-in module associated with the intended recipient's communications server. The UI hooks 195 may be used for operations that are specific to one or few of the messaging services. For example, the UI hooks may be used to fetch an array of members from a messaging services server. The array of members may be those listed in an address book of the user, for example. In some embodiments, the UI hooks may be used to perform functions that can optionally be supported by a plug-in module of a particular messaging service.

The scheduler 199 may manage the pinging of one or more message services. A message service may require a client device to ping a server on a regular basis. In response to such pinging, the server may respond to the client as to whether any communications intended for transmission to a communication device associated with the client await transmission. Such pinging will be described in greater detail below.

Transmissions may include visually presentable information, while other transmissions may include more abstract information. Each packet may include a visual and/or an abstract qualifier identifying whether the packet contents is of the visually presentable type or the abstract type. An example of visually presentable information is the characters of a text message. Characters can be displayed on a display device for consumption by a recipient. Other examples of a visual packet may be a photo or a video, for examples. An example of an abstract packet may be a code indicative that a previously transmitted message has been read by the recipient. When a communications device receives such a read confirmation, the device may display a visual indicator of this confirmation and associate it with the previously sent text bubble. In this way, abstract packets may be communicated using visual indicia. Thus, although abstract packets may differ from visual packets, visual indicia may be used to communicate the information communicated in the abstract packet. Another example of an abstract packet may be one that identifies online statuses of a user's contacts. For example, if a contact associated with a messaging service comes online, a packet may be transmitted to the user indicating this status change (from offline to online) The communications device of the user may display indicia indicating the contacts status so as to communicate the contact's online presence to the user.

Figure 2:
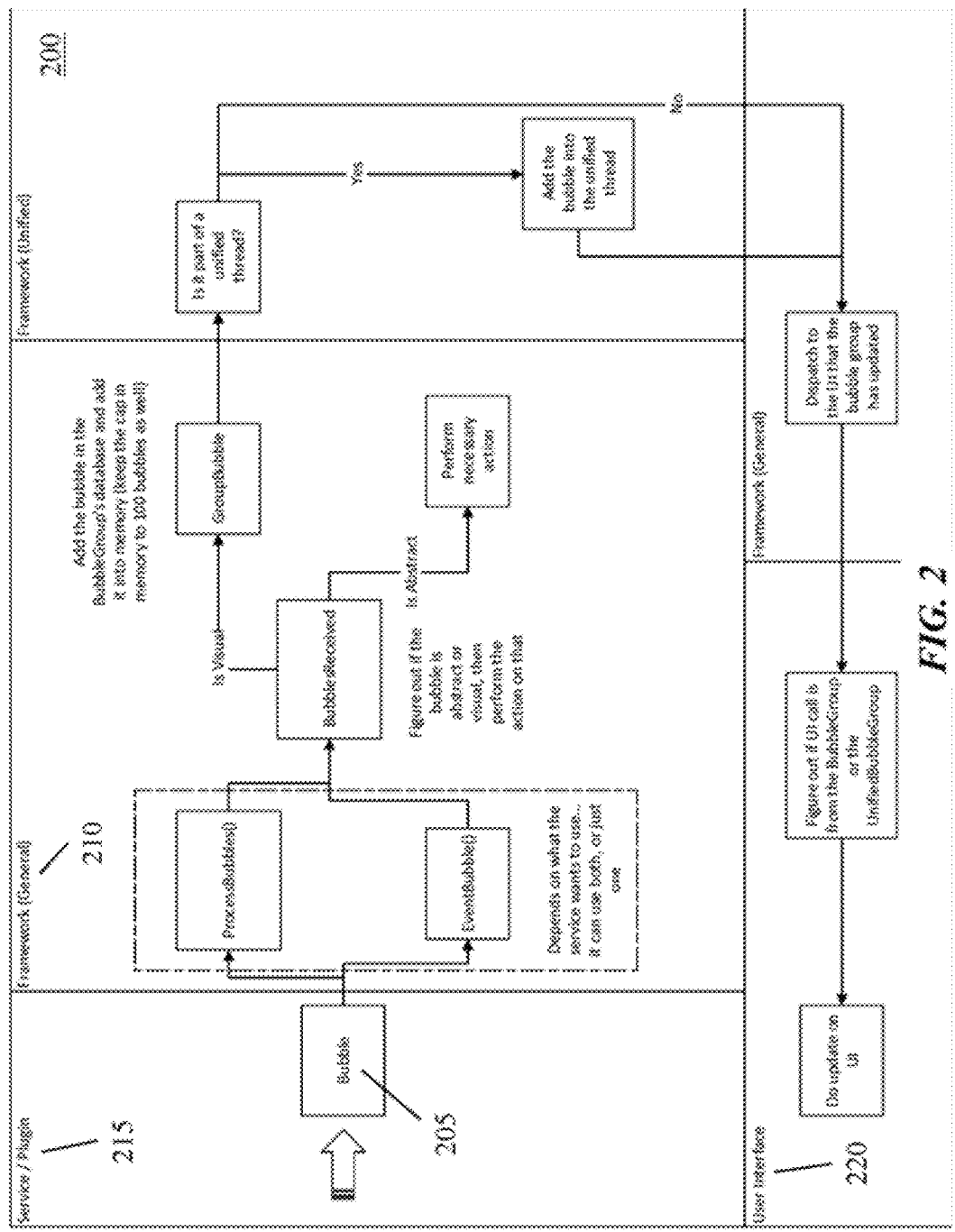
FIG. 2 depicts an exemplary flowchart of a method of receiving a communication element from one of a plurality of supported services.
Figure 3:
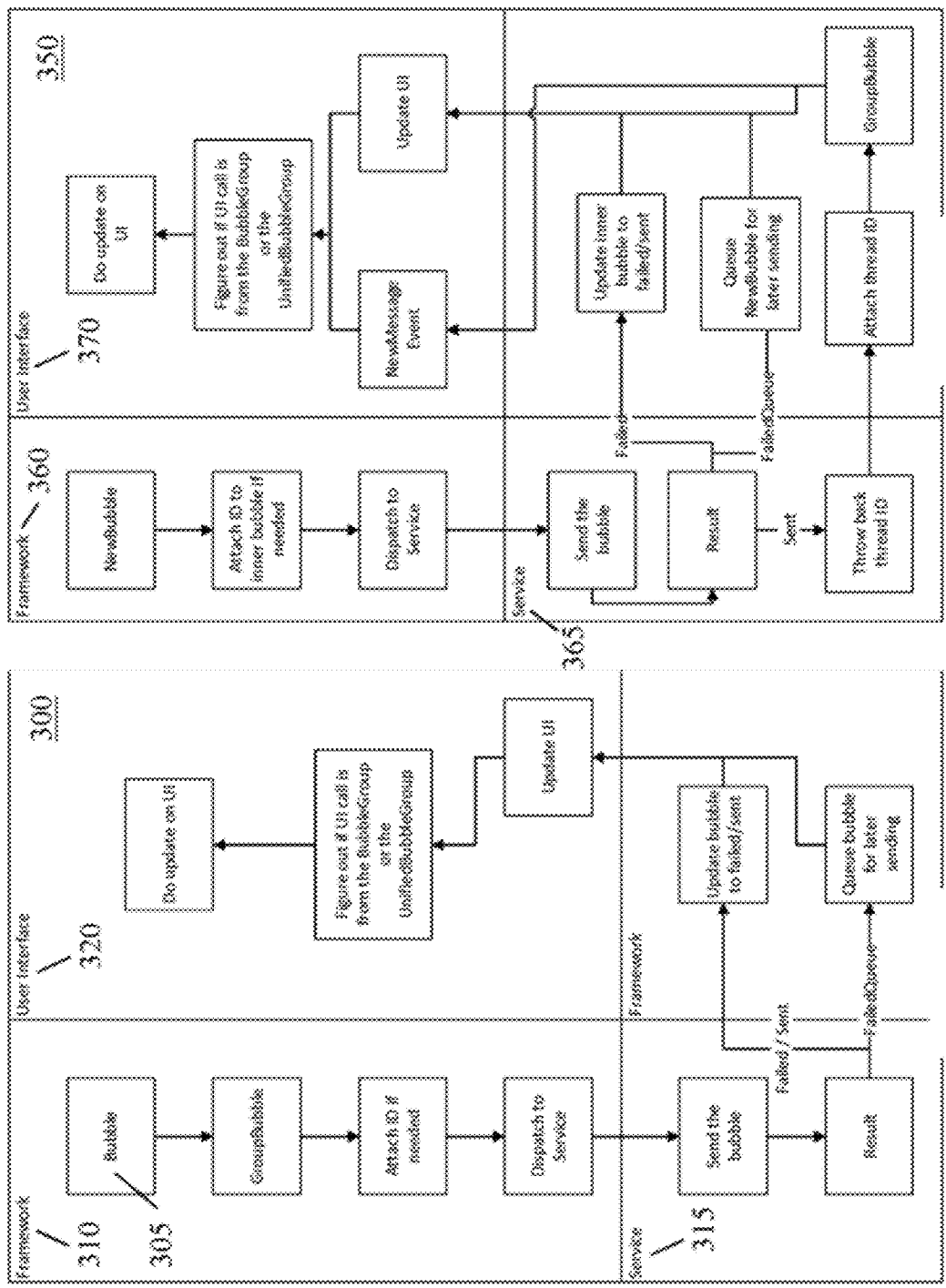
FIGS. 3A-3B depict flowcharts of exemplary methods of sending a communication element to one of a plurality of supported services.

FIG. 2 depicts an exemplary flowchart of a method of receiving a communication element from one of a plurality of supported services. In FIG. 2, an exemplary method 200 of receiving a communication bubble 205 involves operations performed by a framework section 210, a plug-in section 215 and a user interface 220. The received bubble 205 is first handled by the plug-in 215. The bubble 205 may be received in different ways. For example, the bubble may be sent over a text messaging protocol (e.g. SMS/MMS) the received message may be handed by an event system. A communications system (e.g. an Android OS) may generate an interrupt in response to receiving the bubble 205 in the form of a text message. Some messaging services may require remote devices to poll a server before transmitting communications to a remote device. After the server has been polled, the server may respond by sending any pending communications that have target identification indicia that corresponds with the polling device. The framework provides support for both event driven bubble transmissions and bubble transmissions in response to server polling.

After receiving a new packet, the framework determines the type of bubble, visual or abstract. If the received bubble is abstract, the framework may call a routing that handles the abstract bubble in the appropriate manner. If, however, the received bubble is visual, the framework will call a routine that adds the visual information to the bubble group. The framework then determines if the bubble group is part of a unified thread. A user may have combined two or more threads into a single unified thread. If the received bubble is part of a thread that has been combined into a unified thread, the framework will call a routine that adds the bubble to the unified thread. If, however, the received bubble is not part of a unified thread, or after the bubble has been added to the unified thread, the framework calls a routine that dispatches information of which threads have been updated to the user interface. The user interface then determines which bubble group or groups that need updating. The bubble groups that need updating may include one or more unified bubble groups in addition to the bubble group that is associated with the received bubble. The user interface then sends signals to a display device that communicate the updated information to be displayed.

FIGS. 3A-3B depict flowcharts of exemplary methods of sending a communication element to one of a plurality of supported services. In FIG. 3A, an exemplary method 300 of sending a new communication bubble 305 associated with an already established bubble thread. The exemplary method 300 involves operations performed by a framework section 310, a messaging service 315 and a user interface 320. The method begins when a user interface receives a message input by a user and transfers the information as a bubble to the framework. The bubble is then associated with a bubble group that corresponds to the intended participants of the communication. A bubble group may include two or more specific users. An ID may be attached to the bubble if needed by the messaging service associated with the communication. The framework then dispatches the bubble to the messaging service.

The dispatched bubble is then received by the messaging service and forwarded to the intended recipient. The messaging service then determines if the transmission of the bubble to the intended recipient was successful or not. If the transmission failed, the messaging service may send a bubble to the sending device indicating such failure. Some services may queue the bubble for subsequent transmission attempts to the intended recipient. If, however, the transmission was successful, the messaging service may send a bubble to the sending device indicating successful delivery of the bubble.

The user interface may then review the status information from the bubbles received from the messaging service. The user interface then determines which bubble, bubble group and/or unified bubble groups are associated with the received status information. The user interface then updates the display information of the associated bubble, bubble group and/or unified bubble groups.

In FIG. 3B, an exemplary method 350 of sending a new communication bubble 355 of a new bubble thread. The exemplary method 350 involves operations performed by a framework section 360, a messaging service 365 and a user interface 370. The method begins with the framework receiving the new bubble from the user interface. An identification code may be attached to the bubble information, if needed by the communications channel to be used. The bubble is then dispatched to the communications service. The communications service then sends the bubble to an intended receiving device.

After sending the bubble to the intended receiving device, the communications service then determines whether the sent bubble was successfully received by the intended receiving device. If the bubble was not successfully received by the intended receiving device, the communications service may send a status bubble that indicates such unsuccessful result to the framework. Some frameworks may queue the message for retransmission should a status bubble indicate unsuccessful transmission. If, however, the transmission was successful, the communications service may send a bubble indicating a thread identification code to be used for the new thread.

After the bubble has been successfully transmitted, the framework then attaches the received thread identification code to the bubble group. The framework then communicates to the user interface the information requiring display. The display-required information may include both visual and abstract bubble information. The user interface then determines the bubble, bubble group, and/or unified bubble groups that are associated with the display-required information. The user interface then sends signals to the display device to communicate both visual bubble information and abstract bubble information.

Figure 4:
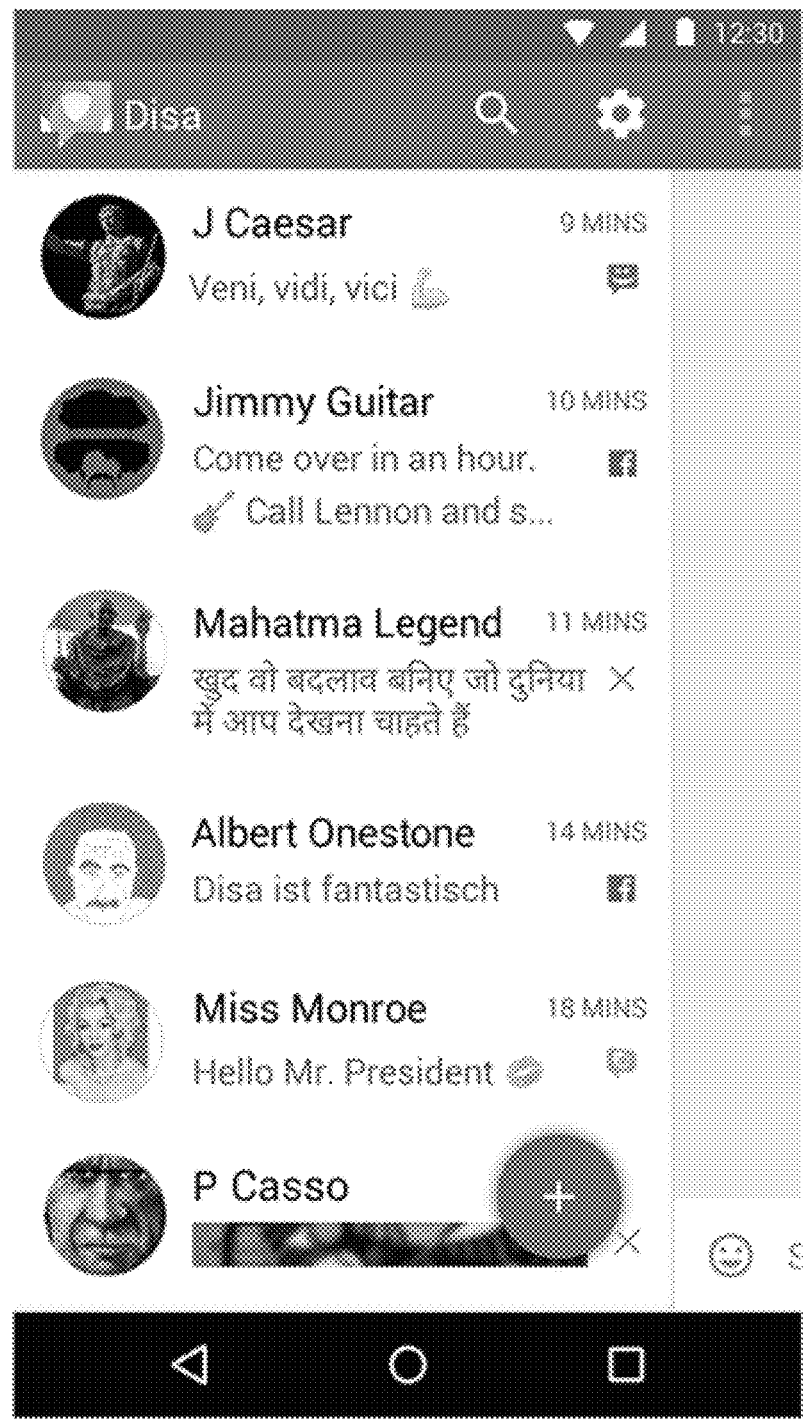
FIG. 4 depicts an exemplary screen capture displaying a list of communication threads.

FIG. 4 depicts an exemplary screen capture 400 displaying a list of communication threads. In FIG. 4, the exemplary screen capture 400 displays a listing of bubble groups. The listing may include both bubble groups and unified bubble groups. The display of each bubble group may include a name indicative of the user or users associated with the displayed bubble group. The display group may include indicia of the communications service used by the bubble group. Each bubble group display may also include a portion of the last visual bubble of the thread. In some embodiments, the display of a bubble group may include indicia of the status of a contact. For example, if a contact is online at the moment, indicia indicative of such online presence may be displayed. In FIG. 4, a merged conversation is marked by an 'X'. In such a case, server communications may be unified in the framework and UI, and in some cases merge multiple communications into a unified thread. For example, a conversation has merged Facebook, Telegram, and Text messages together into one unified UI thread.

Figures 5A, 5B:
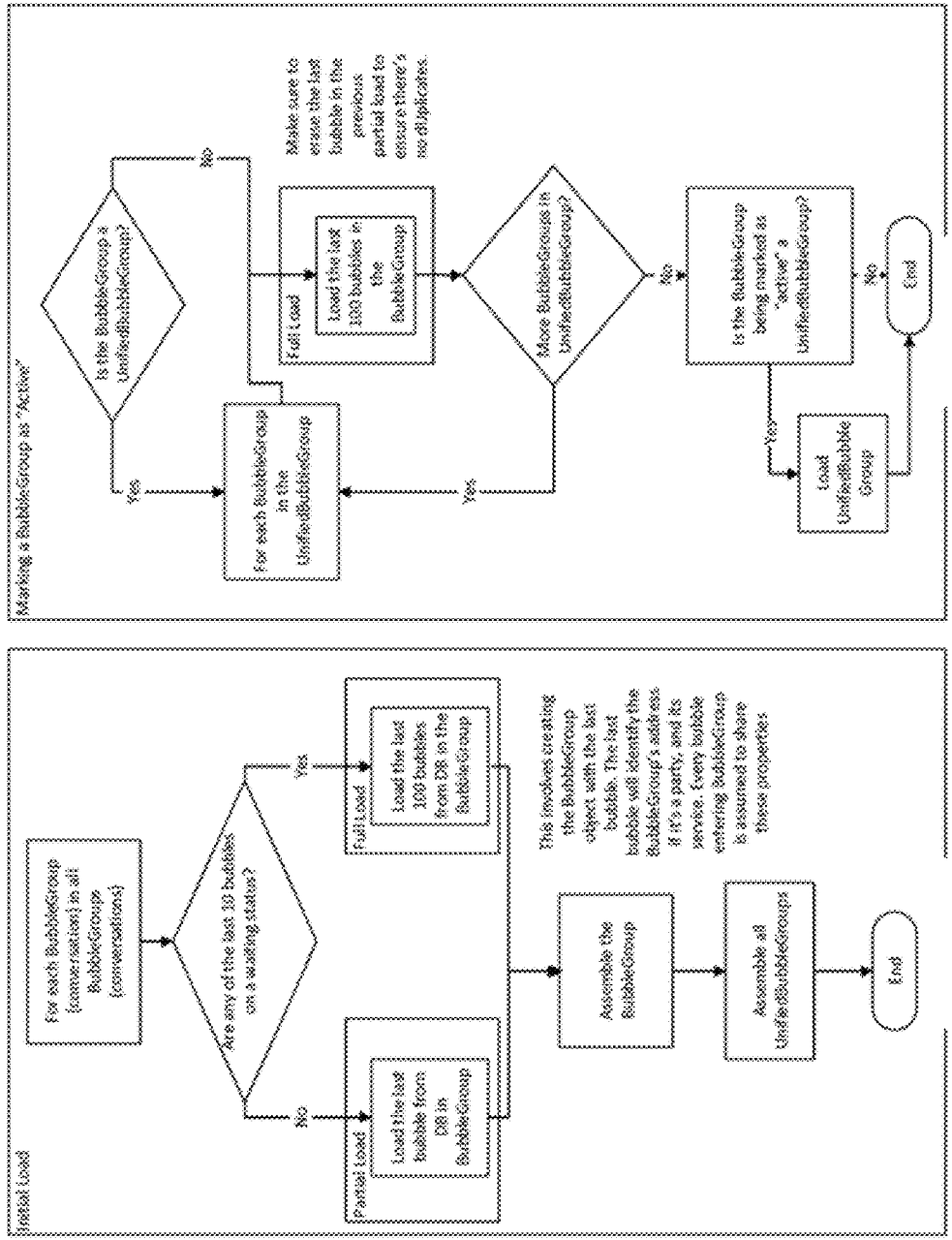
FIGS. 5A-5B depict flowcharts of an exemplary method of populating a communication history corresponding to a single communication thread.

FIGS. 5A-5B depict flowcharts of an exemplary method of populating a communication history corresponding to a single communication thread. The communication history of a bubble group may be stored in memory locations of a communications device. When so stored, the history of the bubble group can later be retrieved and displayed for consumption by the user of the communications device. The user may review the history of a bubble thread before adding communications to the thread. In FIG. 5A, an exemplary method for initially loading the stored histories of the bubble threads begins with identifying a first bubble group. The most recent ten bubbles associated with identified bubble group are retrieved. If any of these last ten bubbles have a status indicating that they have not yet been successfully sent, then all of the bubbles associated with the bubble group are retrieved. If, however, none of the last ten bubbles have a status indicating that they have not yet been successfully sent, then only these last ten bubbles are retrieved. The retrieved bubbles are assembled in a logical fashion. For example, the bubbles may be organized either in chronological or inverse chronological order. After assembly of the identified bubble group, the method may return to the first step and identify the next bubble group.

After all bubble groups have been assembled, the unified bubble groups may be assembled. The unified bubble groups may not have the bubbles associated with the unified groups stored in memory. These bubbles are already stored as they are associated with a (non-unified) bubble group. Unified bubble groups may have stored information pertaining to which bubble groups are associated with the unified bubble group.

In FIG. 5B, an exemplary method for marking a bubble group as active is depicted. The first step is to determine whether the bubble group is a simple bubble group or a unified bubble group. If the bubble group is a unified bubble group, the first bubble group associated with the unified bubble group is selected. If, however, the bubble group is a simple bubble group or the selected simple bubble group of the unified bubble group, then the last one-hundred bubbles associated with the simple bubble group are loaded. Such a full loading of the last one-hundred bubbles may be trigger by various triggers. For example, a full loading of one-hundred bubbles may be triggered when a conversation is first selected from a conversation list. In some embodiments, a full loading may be triggered automatically when a new message is received in a conversation. A full loading may be triggered when a conversation bubble status (e.g. read, sent, delivered, etc.) is updated, for example. By way of example, and not limitation, a full loading may be about 50, 60, 75, 80, 100, 150, or all conversations associated with an entity. If, however, the bubble group is a unified bubble group, the next associated simple bubble group is selected and the bubbles of the selected group are loaded again. The method then tests whether the bubble group is being marked as active. If the bubble group is being marked as active, the bubble group will be so marked and handled as such.

Figures 6A, 6B:
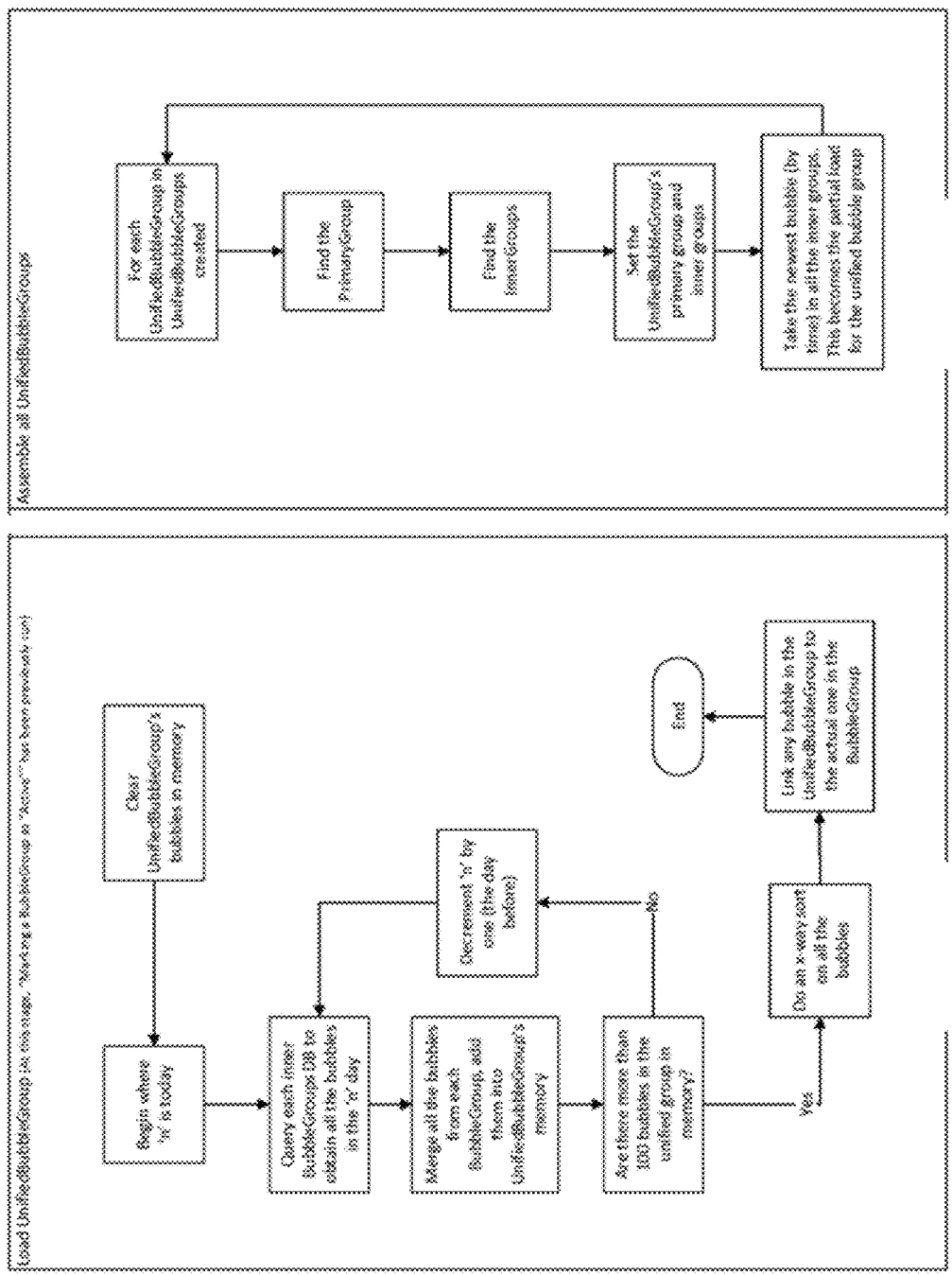
FIGS. 6A-6B depict flowcharts of exemplary methods of populating a communication history of a unified group of communication threads.

FIGS. 6A-6B depict flowcharts of exemplary methods of populating a communication history of a unified group of communication threads. FIG. 6A depicts an exemplary method 600 for loading a unified bubble group. This method begins after all simple bubble groups have been loaded. The memory space designated for storing bubbles associated with the unified bubble group is cleared. Then an index is assigned to today's date. Each bubble group associated with the unified bubble group are queried for bubbles associated with today's date. The retrieved today's bubbles are merged. The merged bubbles are counted and the count is compared with one-hundred. If fewer than one-hundred bubbles have been merged, the index is assigned to the previous date to the current index. Then the method returns to the step in which the bubble groups are queried to obtain bubbles of the index date. If, however, one-hundred or more bubbles have been retrieved and merged, the merged bubbles are sorted. Then each bubbles in the unified bubble group is linked to its actual bubble in one of the simple bubble groups from which it has been retrieved.

FIG. 6B depicts and exemplary method of assembling all unified bubble groups. The method begins with by identifying the first unified bubble group. Then the primary inner bubble group associated with the unified bubble group is identified. Then the other inner bubble groups associated with the unified bubble group are identified. The bubbles associates with the unified bubble group are loaded using a method like that depicted in FIG. 6A, for example. Then the next unified bubble group is identified and the method repeats.

Exemplary message coordination systems are designed to coordinate messaging activities using two or more different messaging services. Each messaging service may have specific protocols, distinct from one another. Each protocol may require cooperative behaviors of remote communications devices. Coordinating these required behaviors may advantageously reduce computer processing activities of the remote device. For example, battery usage may be conserved by coordinating activities of multiple communications protocols. Remote communications devices conserve battery life in many ways. One such conservation technique may be to put the remote device in sleep mode when the device is not in active use. Sharing wakelock requests among communications of two or more distinct communications services may minimize the time a remote device operates in a wake state. A remote communications device may coordinate pinging activities to minimize wake time of a communications device, and thereby maximize battery life.

Figure 7A:
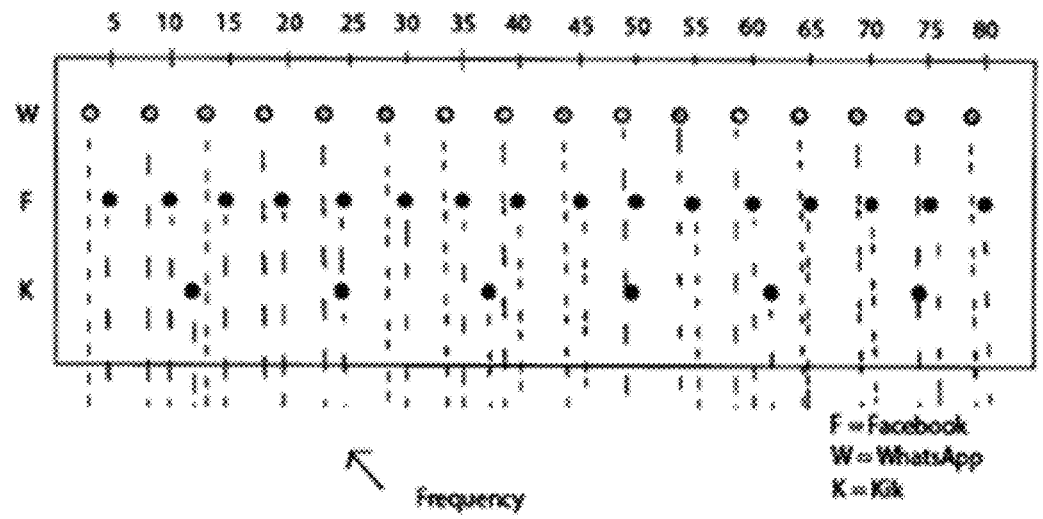
FIGS. 7A-7B depict schematics of an exemplary composite wakelock request schedule having three different wakelock request schedules, each corresponding to a different communication service.
Figure 7B:
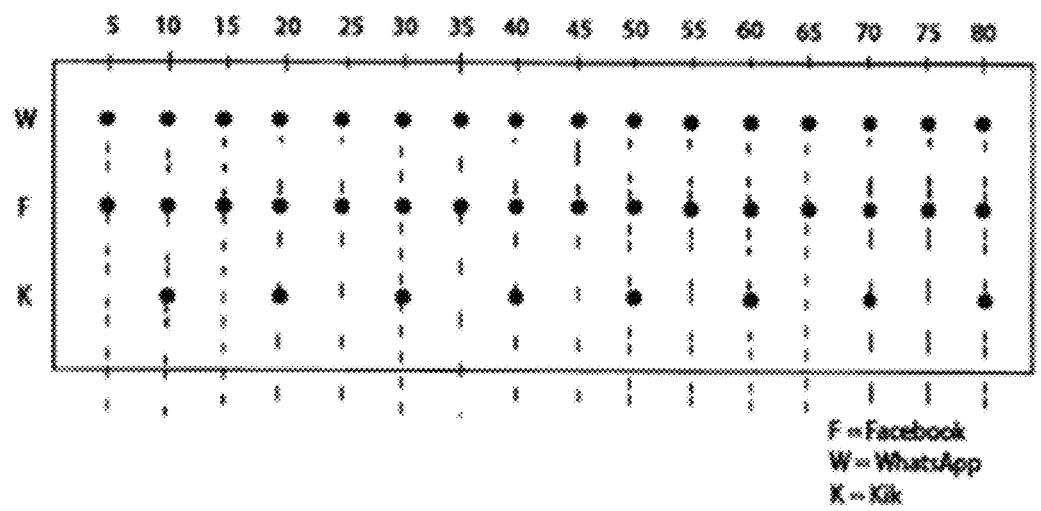

FIGS. 7A-7B depict schematics of an exemplary composite wakelock request schedule having three different wakelock request schedules, each corresponding to a different communication service. FIG. 7A depicts a schematic of an exemplary uncoordinated composite wakelock request schedule of three different wakelock request schedules. Each of the three wakelock request schedules may correspond to a communications service different from the communications services corresponding to the other wakelock request schedules. Each of the depicted wakelock request schedules have different specified timing interval for pinging a messaging service. In the depicted example, a first wakelock request schedule may have been initiated when a user began communicating to a contact using a chat application supported by a first communications service. The first communications service requires a remote communications device to ping the server every five minutes. A second wakelock request schedule may have been initiated two minutes after the first wakelock request schedule was initiated when a user began communicating to a contact using a chat application supported by a second communications service. The second communications service requires a remote communications device to ping the server every five minutes. And a third wakelock request schedule may have been initiated eight minutes after the first wakelock request schedule was initiated when a user began communicating to a contact using a text messaging application supported by a third communications service. The third communications service requires a remote communications device to ping the server every ten minutes.

FIG. 7B depicts a schematic of an exemplary coordinated composite wakelock request schedule of the three different wakelock request schedules depicted in FIG. 7A. The three wakelock request schedules have been time shifted so that the wakelock request schedule of the second communications service aligns is coincident with the wakelock request schedule of the first communications service. The wakelock request schedule of the third communications service aligns each schedule wakelock request with one of the wakelock requests of the coincident first and second wakelock request schedules. Thus, when a mobile communications device is awakened, either two or three pinging activities may be performed. Any overhead associated with awakening the remote communications device is shared by the three pinging activities.

Figure 8:
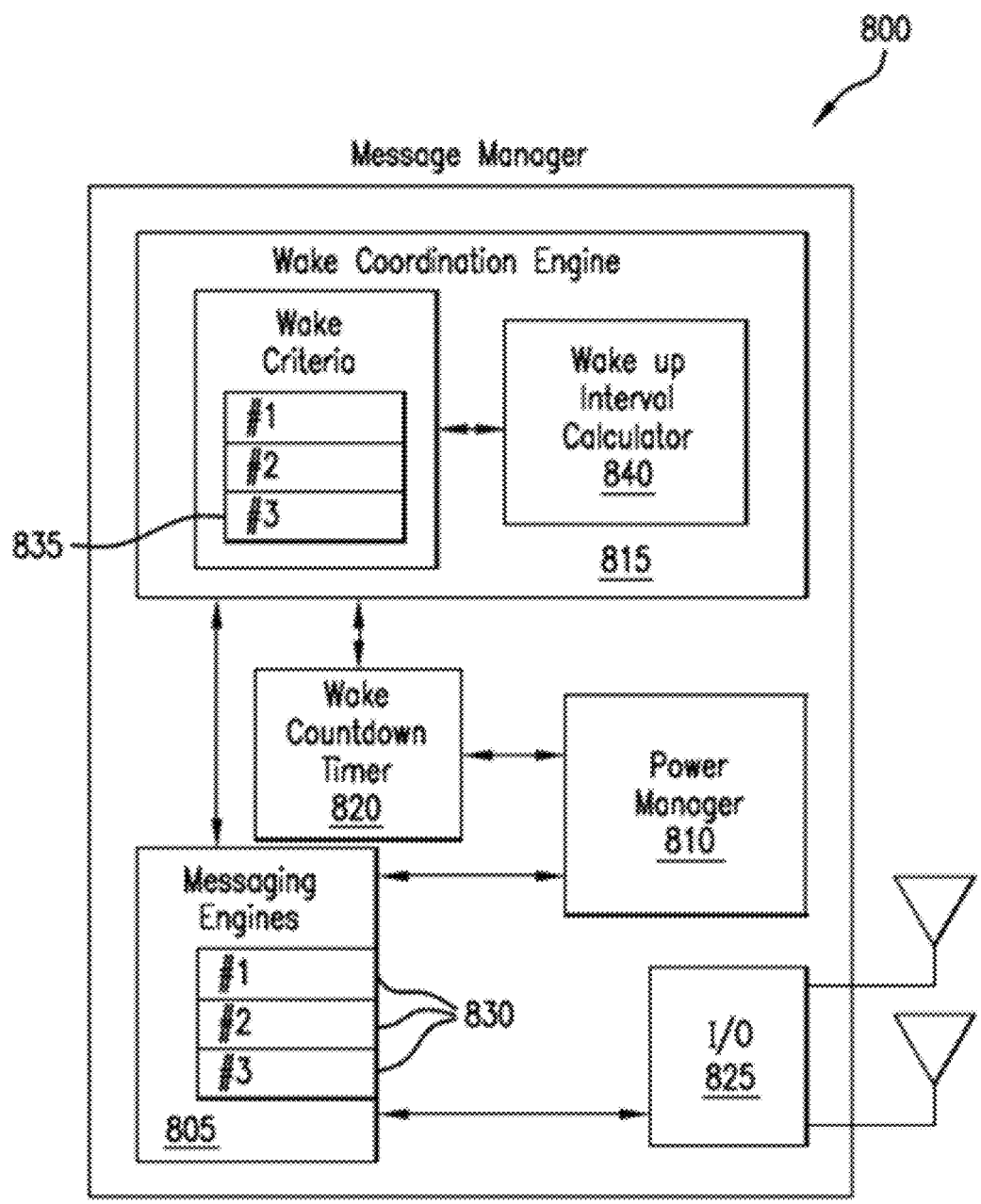
FIG. 8 depicts a block diagram of an exemplary multi-service messaging manager system.

FIG. 8 depicts a block diagram of an exemplary multiservice messaging manager system. In FIG. 8, an exemplary message manager 800 includes messaging engine 805, a power manager 810, a wake coordination engine 815, a wake countdown timer 820 and an input/output module 825. The messaging engine 810 includes plug-in modules 830 associated with various communications services. Each plug-in 830 may translate communications service specific signals to and/or from common signals used by the message manager 800 to for communications coordination. The wake coordination engine 815 includes wake criteria 835 associated with communications protocols corresponding to the plug-in modules 830. The wake coordination engine 815 has a wake-up interval calculator 840. The wake-up interval calculator 840 may generate a wakelock request schedule based upon the wake criteria 835 corresponding to the plug-ins 830.

Figure 9:
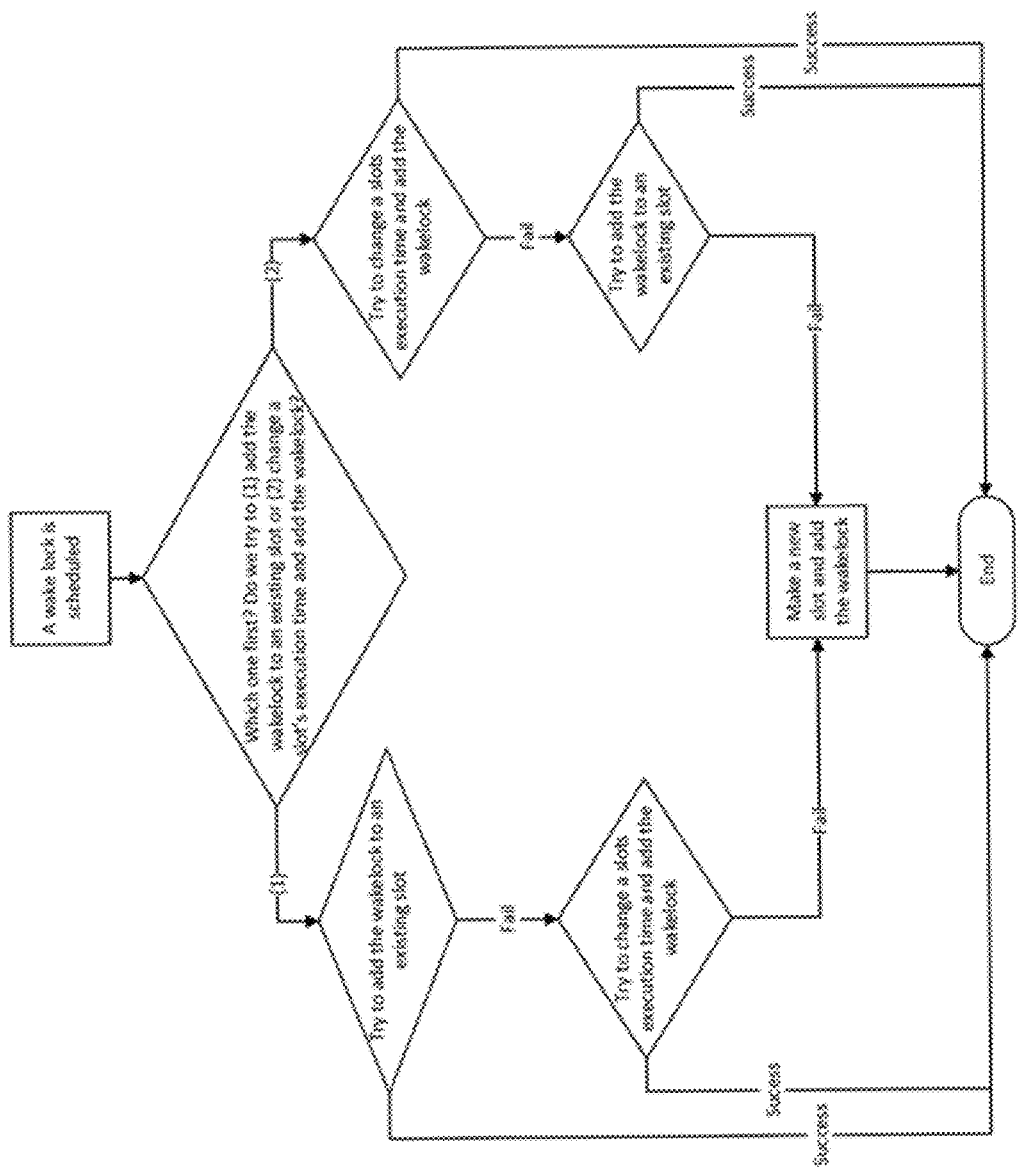
FIG. 9 depicts a flowchart of an exemplary method of adding a new wakelock request schedule to an existing composite wakelock request schedule.

FIG. 9 depicts a flowchart of an exemplary method of adding a new wakelock request schedule to an existing composite wakelock request schedule. In FIG. 9, a flowchart of an exemplary method of coordinating two or more wakelock request schedules is shown. The method begins with a new wakelock being scheduled. This new wakelock may be scheduled in response to a user downloading a new communications app to a mobile communications device, for example. The new communications app may require a pinging schedule specific to a communications service. The pinging schedule specific to the communications service is merged into a coordinated wakelock request schedule in one of two methods. In the first method, timing requirements of the new wakelock request is compared with the coordinated schedule to determine if the new wakelock request can share an existing scheduled wakelock request. If the new wakelock request cannot share an existing scheduled wakelock request slot, then the scheduled wakelock request slots are analyzed to determine if one can be changed so as to be shared by the new wakelock request. If none of the existing schedule wakelock request slots can be modified so as to be shared by the new wakelock request, a new wakelock request will be added to the coordinated wakelock request schedule. If, however, the new wakelock request can simply share an already scheduled wakelock request slot, then it will be added to that slot. Or if the existing schedule can be modified so as to provide a wakelock request slot to be shared by the new wakelock request, then the schedule will be so modified and the new wakelock request added to the modified slot.

In the second method, the order of attempting to modify the existing schedule and attempting to add the new wakelock request to the existing schedule, are interchanged. A judicial selection of the order of operation may reduce the processing time needed to coordinate wakelock request schedules, for example.

Figure 10:
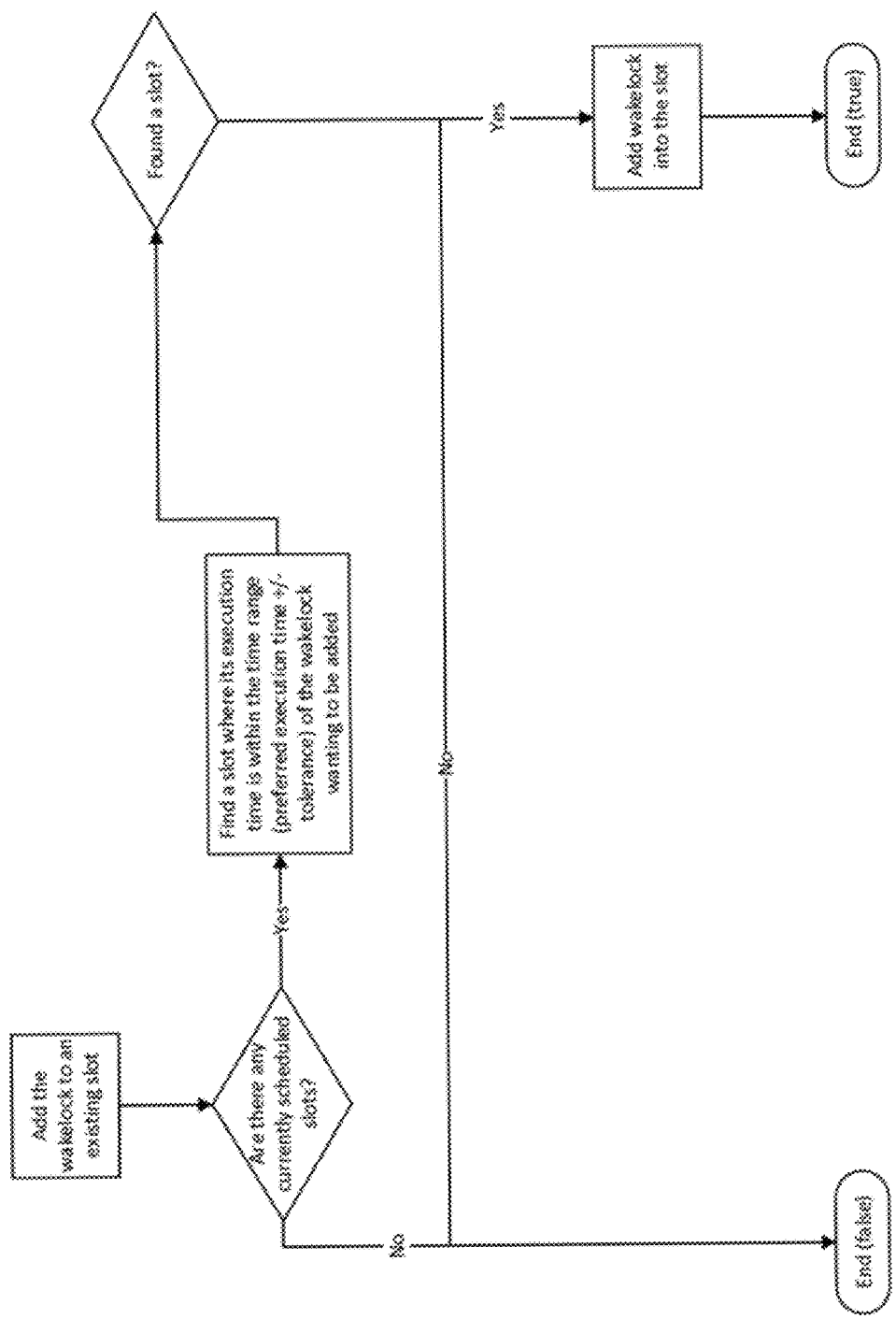
FIG. 10 depicts a flowchart of an exemplary method of determining whether a new wakelock request schedule can be combined to an existing composite wakelock request schedule.

FIG. 10 depicts a flowchart of an exemplary method of determining whether a new wakelock request schedule can be combined to an existing composite wakelock request schedule. In FIG. 10, a flow chart of an exemplary method of attempting to add a new wakelock request into an already scheduled wakelock request slot is depicted. The method begins with a new timing constraint for when a wakelock request. Then a coordinated wakelock request schedule is queried to determine if any wakelock request slots have been scheduled. If no wakelock request slots have been scheduled, then the method ends. If however, wakelock requests have been scheduled, the method determines if any of the scheduled slots can be shared by the new wakelock request. Communications services may require pinging at specified intervals. These specified intervals may include a nominal interval as well as a tolerance about the nominal interval. For example, a messaging service may require remote communications devices to ping a server every ten minutes with a plus or minus two minute tolerance. Thus the remote device may ping the server as soon as eight minutes and as late as twelve minutes in this example. Thus a wakelock request slot that is between eight and twelve minutes may be shared by this nominally ten minute wakelock request. If a wakelock request slot is found that can be shared by the new wakelock request, the wakelock is added to the found slot. If no sharable slot can be found, or after the wakelock request has been added to a sharable slot, the method ends.

Figure 11:
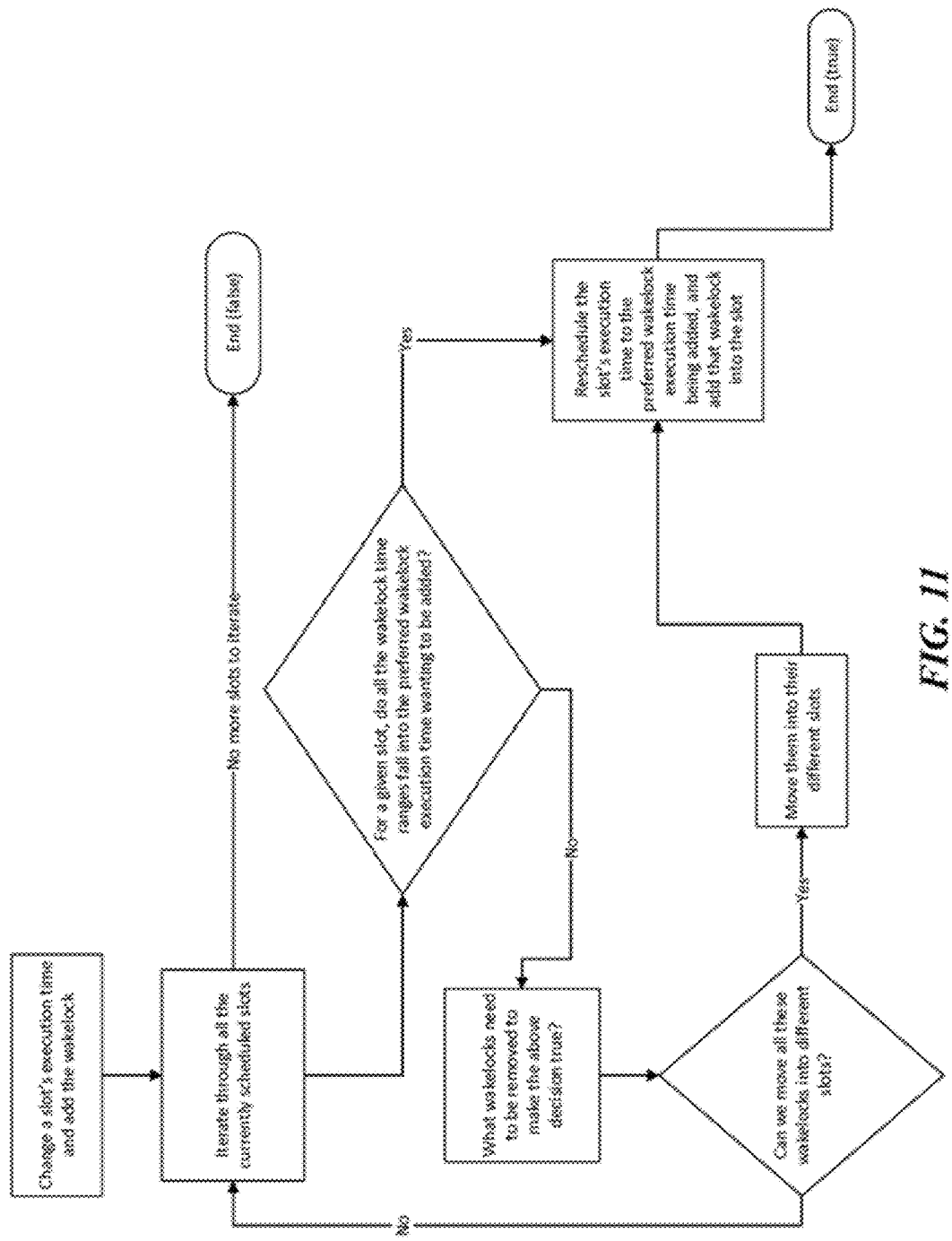
FIG. 11 depicts a flowchart of an exemplary method of modifying an existing composite wakelock request schedule to accommodate a new wakelock request schedule.

FIG. 11 depicts a flowchart of an exemplary method of modifying an existing composite wakelock request schedule to accommodate a new wakelock request schedule. In FIG. 11, a flow chart of an exemplary method of modifying an existing wakelock request schedule so as to share a modified scheduled slot with a new wakelock request. The method first selects the first scheduled wakelock request. Then the method test all of the wakelock requests associated with the selected slot to determine if all of them can be rescheduled so as to be shared by the new wakelock request. Each of the associated wakelock requests may have its own nominal time and tolerance about the nominal time. If all of the wakelock requests associated with the scheduled slot can be so modified, the slot will be rescheduled to such a sharable time and the new wakelock will be added to the numbers of associated wakelock requests. If, however, not all of the wakelock requests can be modified so as to be shared by the new wakelock request, then those wakelock requests that cannot accommodate the new wakelock request are selected. These unaccommodating wakelock requests are evaluated as to whether they can be rescheduled into another scheduled wakelock request slot. If no such rescheduling is found possible, then the method returns to step .xxx and selects the next scheduled wakelock request for sharing evaluation. If, however, the unaccommodating slots can be rescheduled so as to share another scheduled wakelock request slot, then they are rescheduled and added to the slots with which they share.

Figure 12:
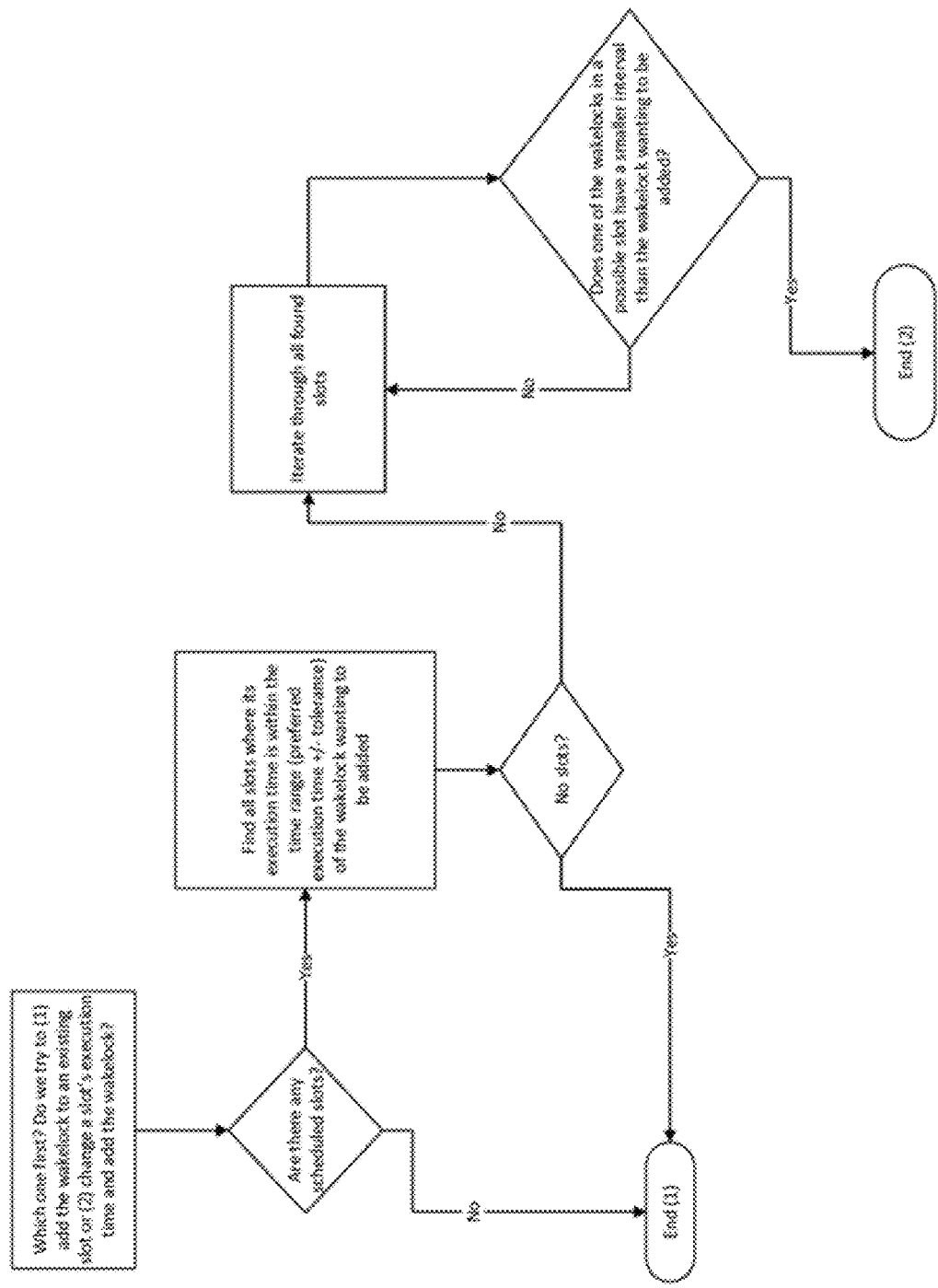
FIG. 12 depicts a flowchart of an exemplary method of determining whether to first try to add a new wakelock request schedule to an existing composite wakelock request schedule or to modify the existing composite wakelock request schedule to accommodate the new wakelock request schedule.

FIG. 12 depicts a flowchart of an exemplary method of determining whether to first try to add a new wakelock request schedule to an existing composite wakelock request schedule or to modify the existing composite wakelock request schedule to accommodate the new wakelock request schedule. The method begins by querying a coordinated wakelock request schedule as to if any wakelocks have been scheduled. If so, each of the scheduled wakelock request slots is tested to determine if the new wakelock request can be added to the slot. If no slots are found, then the method will first test for an existing sharable slot before attempting to modify the schedule of wakelocks. If however sharable slots are found, then the found slots are tested as to the usable sharable interval. The new wakelock request may be added to the slot having the largest sharable interval, in some embodiments. The method may end with the selection of first attempting schedule modification before attempting to find a sharable slot.

Figure 13:
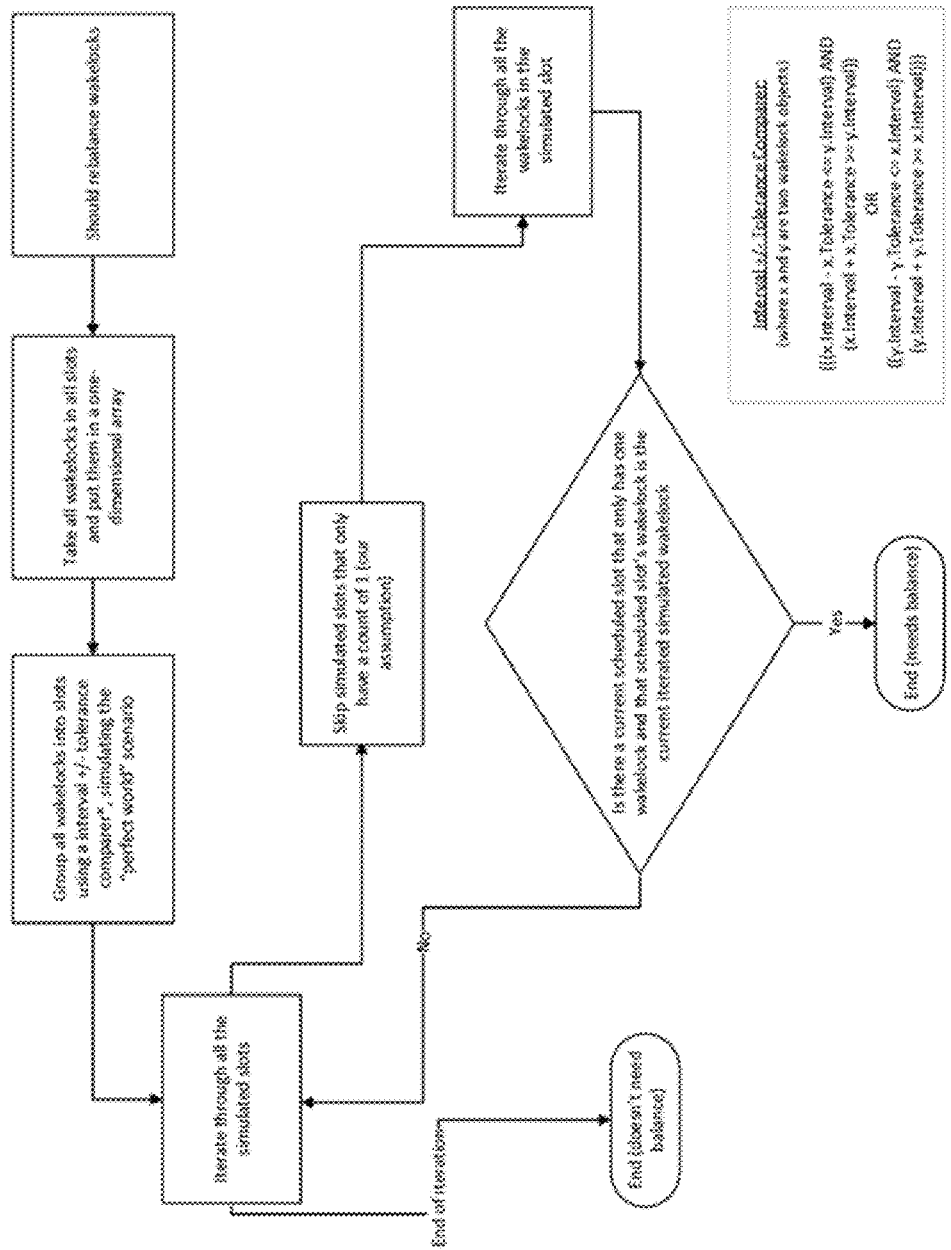
FIG. 13 depicts a flowchart of an exemplary method of determining whether an existing composite wakelock request schedule should be rebalanced.

FIG. 13 depicts a flowchart of an exemplary method of determining whether an existing composite wakelock request schedule should be rebalanced. In FIG. 13, the method begins by creating a simulated schedule of all the wakelock requests as if the wakelock request schedule can begin anew. Each of the wakelock request slots of the simulated schedule are sequentially selected. If the selected wakelock request slot has only one wakelock request, it is skipped. If the wakelock request slot has two or more wakelock requests, iterate through the wakelock requests. Each iterated wakelock request is compared with the existing real wakelock request schedule to determine if the real wakelock request corresponding to the simulated iterated request is associated with a slot that only includes that real wakelock request. If so, rescheduling the wakelock request schedule is required. If not, then the next simulated wakelock request slot is evaluated as above.

Figure 14A:
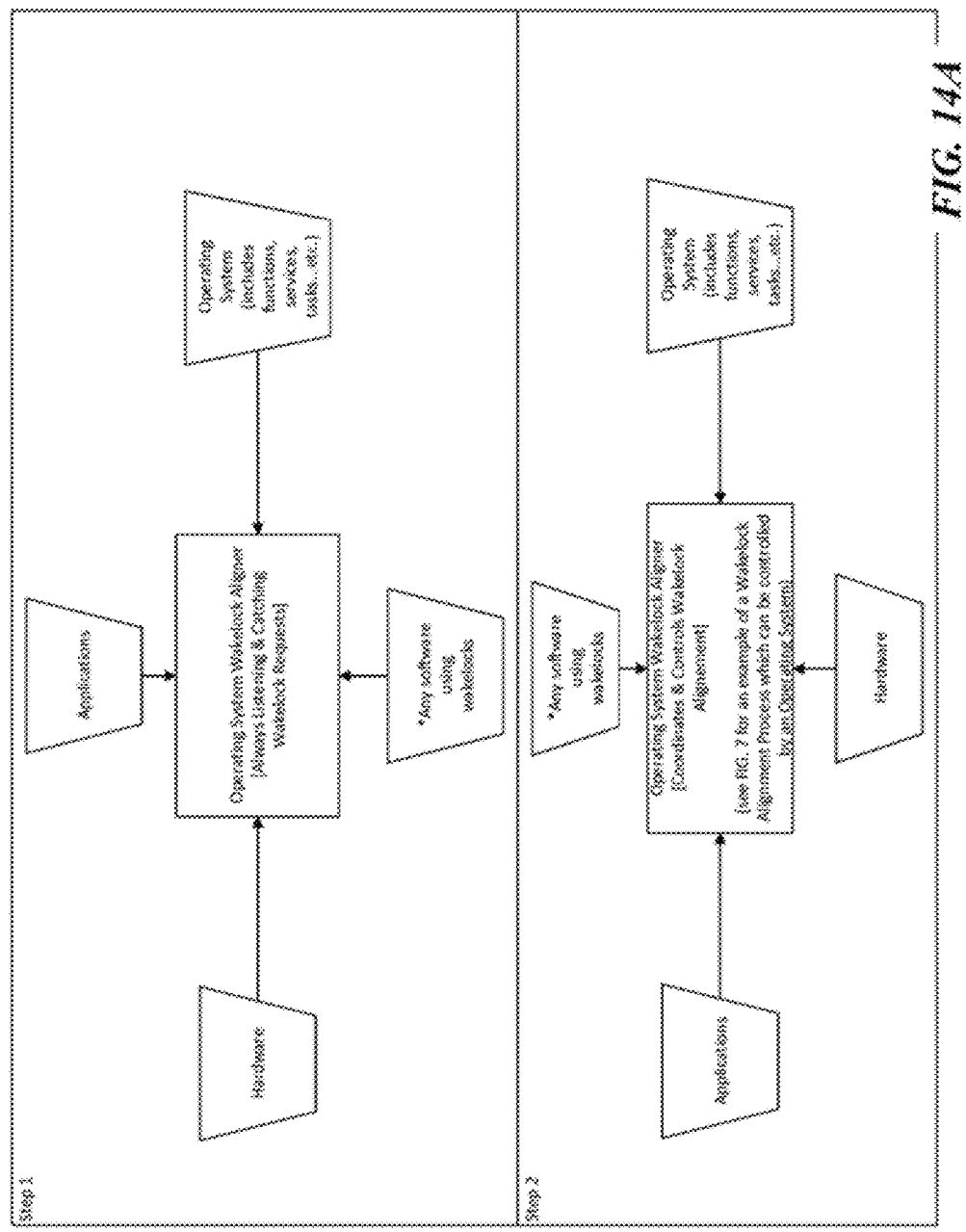
FIGS. 14A-14B depict an exemplary method of a scheduling wakelock events at an operating system level.
Figure 14B:
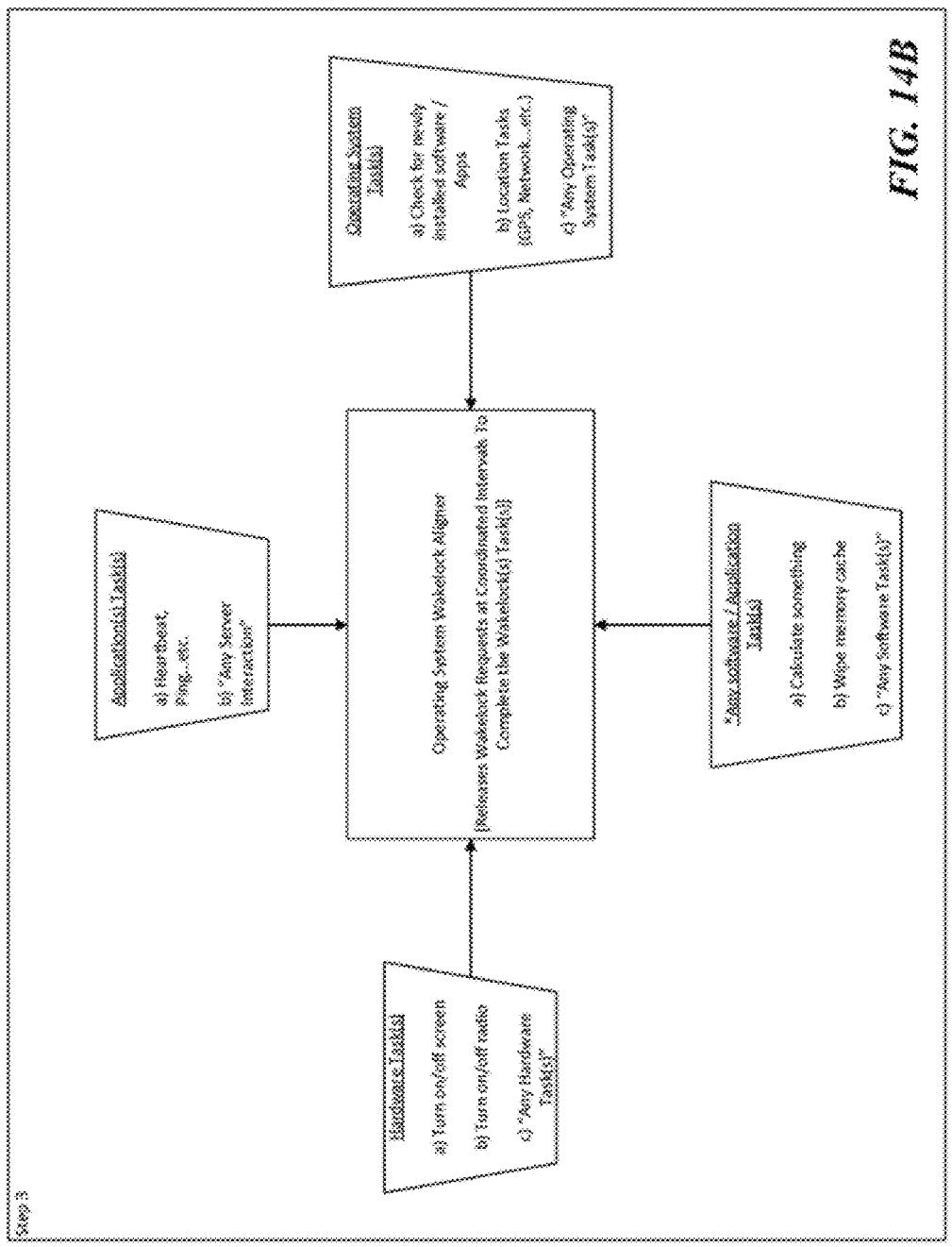

FIGS. 14A-14B depict an exemplary method of scheduling wakelock events at an operating system level. In FIGS. 14A-14B, an exemplary method of coordinating wakelock events from multiple sources, including hardware tasks, Application tasks, operating system tasks and any other software tasks. Examples of hardware tasks may include a turning on or off a display device, turning on or off a radio device, and/or other hardware tasks. Examples of application tasks may include heartbeats and/or pinging, as well as perhaps other server interaction tasks. Examples of operating system tasks may include location tasks (e.g. GPS, network, etc.), installation of software tasks, updates, and/or other operating system tasks. Examples of other software tasks may include calculations, memory operations, and/or other software tasks. The wakelock aligner must remain in a listening mode to receive the wakelock requests from the hardware, software, operating system, and/or applications. The wakelock aligner may then coordinate the wakelock requests received from the various originators of the wakelock requests. The wakelock aligner may minimize the number of wakelock requests by sharing wakelock requests as described above. The wakelock aligner must then release the wakelock requests that the coordinated aligned times that were previously scheduled by the wakelock aligner. The wakelock aligner may then call respond to each of the originators in an appropriate manner at the scheduled times.

Although various embodiments have been described with reference to the Figures, other embodiments are possible. For example, some exemplary pinging coordinators may create a sleep-mode wakelock request schedule whenever a new communications app is installed into a communications device. The sleep-mode schedule may then be initiated substantially coincident with the communications device going to sleep. In some embodiments a wake-mode pinging schedule may be created. The wake-mode pinging schedule may similarly coordinate pinging activities of multiple communications protocols. Such coordinated wake-mode pinging may, for example, minimize high-power wireless communications with remote receivers.

In an exemplary embodiment, an operating system may coordinate wakelock requests originating from among the applications installed and/or running on a device on which the operating system resides. Various applications may have various requirements for waking up the device. An operating system scheduler may provide callable routines in which a program passes a nominal wakelock request and a tolerance about the nominal request. The operating system may then merge the request into a master schedule in one of the manners described above. In this way, not only will communications pinging schedules be merged into a master schedule, but all other application requests as well.

In an exemplary embodiment, an operating system may have an applications interface in which an application passes a wakelock request to the operating system. The applications interface may provide for the application to pass parameters to the operating system. The passed parameters may include a nominal scheduled time and a tolerance about the nominal time. For example, the application may request the processor to awaken every 12 minutes with a plus-or-minus 3 minute tolerance. The operating system then may coordinate the window of 9-15 minutes into an operating-system maintained schedule. For example, the operating system may first evaluate whether an existing wakelock has been requested within the 9-15 minute window. If so, the operating system may simply merge this new request into the existing scheduled wakelock. For example, if the operating system has already scheduled a wakelock at 10 minutes, the operating system may send an interrupt to the requesting applications after waking at 10 minutes. The applications may then perform their necessary operations and await the next wake event.

If, however, the operating system finds no currently scheduled wakelock within the newly requested 9-15 minute window, the operating system may then evaluate scheduled wakelocks on either side of the window to determine whether these adjacent scheduled wakelocks can be moved to within the window. For example, if a wakelock is scheduled at 8 minutes and is shared by two applications, one with a 6-12 minute window and one with a 5-10 minute window, the operating system may reschedule the wakelock for $9\frac{1}{2}$ minutes. The newly scheduled wakelock will then be shared by three applications. In $9\frac{1}{2}$ minutes time, the operating system may be awakened by a timer interrupt. The operating system may then send interrupts to each of the three wakelock sharing applications, which will each perform their necessary scheduled activities.

If an adjacent wakelock request cannot be rescheduled to accommodate the newly requested wakelock, the operating system may then add a new wakelock request to the operating system maintained schedule. Some applications may make different types wakelock requests of the operating system. For example, some requests may be periodic requests. An application may request a wakelock every ten minutes, for example. Some applications may request a single wakelock for example. In some embodiments, an application may send a list of single wakelock requests. In an exemplary embodiment, the application may request periodic wakelocks with a termination time.

The operating system may schedule wakelocks for hardware modules, operating system events and/or needs, and/or application program requests. An operating system may coordinate all requested wakelocks so as to minimize the number of wake events that may result. This minimization of wake events may advantageously minimize the power consumption of the device upon which the operating system may reside. A battery charge may be optimally conserved by minimizing the power consumed as a result of a multiplicity of wake events. Operating system maintenance of a wakelock schedule may best coordinate a wakelock schedule arising from hardware, operating system and applications.

Some aspects of embodiments may be implemented as a computer system. For example, various implementations may include digital and/or analog circuitry, computer hardware, other sensors (e.g. temperature sensors), firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, application-specific integrated circuits (ASICs). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an liquid crystal display (LCD) monitor for displaying information to the user, a keyboard, and a pointing device, such as a mouse or a trackball by which the user can provide input to the computer. As an alternative, the display device may include a touchscreen, such as a capacitive touchscreen or resistive touchscreen. In an example, wearable devices, such as Google Glasses or other technologies may facilitate input and/or output operations between a user and a system.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include a local area network (LAN), a wide area network (WAN), metropolitan area network (MAN), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g/n, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

Figure 15:
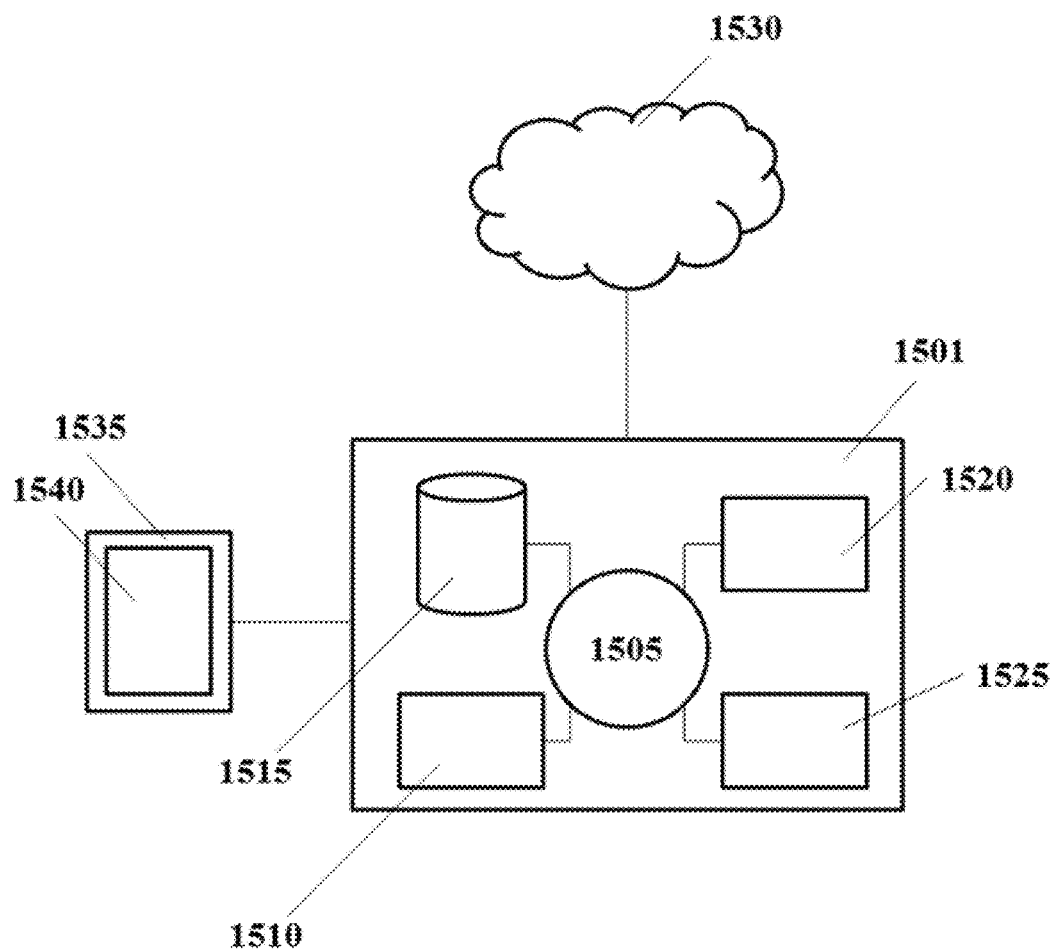
FIG. 15 shows a computer system that is programmed or otherwise configured to implement methods and systems of the present disclosure.

FIG. 15 shows a computer system 1501 that is programmed or otherwise configured to implement methods and systems of the present disclosure. The computer system 1501 can regulate various aspects of methods and systems of the present disclosure, such as, for example, regulating communications to or from a plurality of communication servers and a mobile communications device for improved power consumption by the mobile communications device. The computer system 1501 can be an electronic device of a user or a computer system that is remotely located with respect to the electronic device. The electronic device can be a mobile electronic device.

The computer system 1501 includes a central processing unit (CPU, also "processor" and "computer processor" herein) 1505, which can be a single core or multi core processor, or a plurality of processors for parallel processing. The computer system 1501 also includes memory or memory location 1510 (e.g., random-access memory, read-only memory, flash memory), electronic storage unit 1515 (e.g., hard disk), communication interface 1520 (e.g., network adapter) for communicating with one or more other systems, and peripheral devices 1525, such as cache, other memory, data storage and/or electronic display adapters. The memory 1510, storage unit 1515, interface 1520 and peripheral devices 1525 are in communication with the CPU 1505 through a communication bus (solid lines), such as a motherboard. The storage unit 1515 can be a data storage unit (or data repository) for storing data. The computer system 1501 can be operatively coupled to a computer network ("network") 1530 with the aid of the communication interface 1520. The network 1530 can be the Internet, an internet and/or extranet, or an intranet and/or extranet that is in communication with the Internet. The network 1530 in some cases is a telecommunication and/or data network. The network 1530 can include one or more computer servers, which can enable distributed computing, such as cloud computing. The network 1530, in some cases with the aid of the computer system 1501, can implement a peer-to-peer network, which may enable devices coupled to the computer system 1501 to behave as a client or a server.

The CPU 1505 can execute a sequence of machine-readable instructions, which can be embodied in a program or software. The instructions may be stored in a memory location, such as the memory 1510. The instructions can be directed to the CPU 1505, which can subsequently program or otherwise configure the CPU 1505 to implement methods of the present disclosure. Examples of operations performed by the CPU 1505 can include fetch, decode, execute, and writeback.

The CPU 1505 can be part of a circuit, such as an integrated circuit. One or more other components of the system 1501 can be included in the circuit. In some cases, the circuit is an application specific integrated circuit (ASIC).

The storage unit 1515 can store files, such as drivers, libraries and saved programs. The storage unit 1515 can store user data, e.g., user preferences and user programs. The computer system 1501 in some cases can include one or more additional data storage units that are external to the computer system 1501, such as located on a remote server that is in communication with the computer system 1501 through an intranet or the Internet.

The computer system 1501 can communicate with one or more remote computer systems through the network 1530. For instance, the computer system 1501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1501 via the network 1530.

Methods as described herein can be implemented by way of machine (e.g., computer processor) executable code stored on an electronic storage location of the computer system 1501, such as, for example, on the memory 1510 or electronic storage unit 1515. The machine executable or machine readable code can be provided in the form of software. During use, the code can be executed by the processor 1505. In some cases, the code can be retrieved from the storage unit 1515 and stored on the memory 1510 for ready access by the processor 1505. In some situations, the electronic storage unit 1515 can be precluded, and machine-executable instructions are stored on memory 1510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1501 can include or be in communication with an electronic display 1535 that comprises a user interface (UI) 1540 for providing, for example, communications for view by a user or enable the user to compose communications for transmission. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1505. The algorithm can, for example, generate a schedule that synchronizes (i) transmission of communications from the mobile communications device to a plurality of communications servers or (ii) retrieval of communications from the plurality of communications servers to the mobile communications device over a period of time.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for regulating communications between a mobile communications device and a plurality of communication servers with improved power consumption at said mobile communications device, comprising:
   a) bringing a mobile communications device in network communication with said plurality of communications servers per a schedule that synchronizes (i) transmission of said communications from said mobile communications device to at least a subset of said plurality of communications servers and (ii) retrieval of said communications from at least said subset of said plurality of communications servers to said mobile communications device over a period of time, wherein said mobile communications device includes an electronic display with a user interface for displaying said communications in a unified thread that is configured to display communications from different communications protocols;
   b) using said schedule to (i) retrieve said communications at said mobile communications device from at least said subset of said plurality of communications servers, or (ii) transmit said communications from said mobile communications device to at least said subset of said plurality of communications servers, wherein said communications are retrieved or transmitted over said period of time, and wherein said communications are retrieved or transmitted using said different communications protocols; and
   c) displaying said communications in said unified thread of said user interface, thereby regulating said communications between said mobile communications device and said plurality of communication servers with improved power consumption at said mobile communications device.

2. The method of claim 1, wherein said schedule synchronizes communications to or from a first subset of communications servers of said plurality of communications servers, and communications to or from a second subset of communications servers of said plurality of communications servers, wherein said first subset is different than said second subset.

3. The method of claim 1, wherein at least some of said plurality of communications servers transmit and receive communications of different types.

4. The method of claim 1, wherein at least one of said plurality of communications servers transmits and receives instant messaging communications, and at least one of said plurality of communications servers transmits and receives text message communications.

5. The method of claim 1, wherein said mobile communications device is in intermittent communication with said plurality of communications servers.

6. The method of claim 1, further comprising using a computer processor to generate said schedule to retrieve communications from or transmit communications to said plurality of communications servers.

7. The method of claim 1, wherein said schedule coordinates wakelock requests to said plurality of communications servers.

8. The method of claim 1, wherein (b) comprises pinging said communications servers per said schedule.

9. The method of claim 1, wherein a given communication is displayed in said unified thread with a graphical element that is indicative of which of said plurality of communications servers said given communication was retrieved from or transmitted to.

10. The method of claim 1, wherein said schedule includes a composite wakelock request schedule.

11. The method of claim 10, further comprising, prior to (b), adding a new wakelock request schedule to said composite wakelock request schedule.

12. The method of claim 11, wherein said adding comprises (i) rearranging said composite wakelock request schedule to include said new wakelock request schedule, (ii) adding said new wakelock to an open position, or (iii) restarting a wakelock scheduler that implements said composite wakelock request schedule.

13. The method of claim 10, wherein said wakelock request schedule includes wake-up intervals with coordinated wakelock requests.

14. A system for regulating communications between a mobile communications device and a plurality of communication servers with improved power consumption at said mobile communications device, comprising:
   a communications interface that brings said mobile communications device in network communication with said plurality of communications servers per a schedule that synchronizes (i) transmission of said communications to at least a subset of said plurality of communications servers and (ii) retrieval of said communications from at least said subset of said plurality of communications servers over a period of time, wherein said mobile communications device includes an electronic display with a user interface for displaying said communications to or from said plurality of communications servers in a unified thread that is configured to display communications from different communications protocols; and a computer processor that is programmed to use said schedule to (i) retrieve said communications from at least said subset of said plurality of communications servers or transmit said communications to at least said subset of said plurality of communications servers, wherein said communications are retrieved or transmitted over said period of time, and wherein said communications are retrieved or transmitted using said different communications protocols, and (ii) display said communications in said unified thread of said user interface, thereby regulating communications between said mobile communications device and said plurality of communication servers with improved power consumption at said mobile communications device.

15. The system of claim 14, wherein said computer processor is included in said mobile communications device.

16. The system of claim 14, wherein said schedule synchronizes communications to or from a first subset of communications servers of said plurality of communications servers, and communications to or from a second subset of communications servers of said plurality of communications servers, wherein said first subset is different than said second subset.

17. The system of claim 14, wherein said computer processor is programmed to generate said schedule to retrieve communications from or transmit communications to said plurality of communications servers.

18. The system of claim 14, wherein said schedule coordinates wakelock requests to said plurality of communications servers.

19. The system of claim 14, wherein said computer processor is programmed to ping said communications servers per said schedule.

20. The system of claim 14, wherein said schedule includes a composite wakelock request schedule.

21. The system of claim 20, wherein said computer processor is programmed to add a new wakelock request schedule to said composite wakelock request schedule by (1) rearrange said composite wakelock request schedule to include said new wakelock request schedule, (2) add said new wakelock to an open position, or (3) restart a wakelock scheduler that implements said composite wakelock request schedule.

22. The system of claim 20, wherein said wakelock request schedule includes wake-up intervals with coordinated wakelock requests.

* * * * *